(12) United States Patent
Nakai et al.

(10) Patent No.: US 9,888,541 B2
(45) Date of Patent: Feb. 6, 2018

(54) DEVICE CONTROL SYSTEM, INFORMATION PROCESSING APPARATUS, AND NON-TRANSITORY RECORDING MEDIUM

(71) Applicants: Akiyoshi Nakai, Kanagawa (JP); Kazunari Tonami, Kanagawa (JP); Kiriko Chosokabe, Tokyo (JP); Yuji Ohue, Kanagawa (JP); Akira Murakata, Tokyo (JP); Hideaki Iijima, Kanagawa (JP); Yushi Miyata, Tokyo (JP)

(72) Inventors: Akiyoshi Nakai, Kanagawa (JP); Kazunari Tonami, Kanagawa (JP); Kiriko Chosokabe, Tokyo (JP); Yuji Ohue, Kanagawa (JP); Akira Murakata, Tokyo (JP); Hideaki Iijima, Kanagawa (JP); Yushi Miyata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/449,014

(22) Filed: Mar. 3, 2017

(65) Prior Publication Data

US 2017/0265264 A1 Sep. 14, 2017

(30) Foreign Application Priority Data

Mar. 10, 2016 (JP) ................................. 2016-047573

(51) Int. Cl.
*H05B 33/08* (2006.01)
*F24F 11/00* (2006.01)
*H05B 37/02* (2006.01)

(52) U.S. Cl.
CPC ...... *H05B 33/0848* (2013.01); *F24F 11/0034* (2013.01); *H05B 33/0854* (2013.01);
(Continued)

(58) Field of Classification Search
None
See application file for complete search history.

(56) References Cited

U.S. PATENT DOCUMENTS

2015/0305119 A1* 10/2015 Hidaka ............. H05B 37/0218
315/153
2016/0088696 A1 3/2016 Kizaki et al.
2016/0088706 A1 3/2016 Kizaki et al.

FOREIGN PATENT DOCUMENTS

JP 2000-348874 12/2000
JP 2009-164683 7/2009
(Continued)

*Primary Examiner* — Dedei K Hammond
(74) *Attorney, Agent, or Firm* — IPUSA, PLLC

(57) ABSTRACT

A device control system includes a detecting apparatus configured to detect an object in a predetermined space, and an information processing apparatus configured to control an illuminating apparatus based on a detection result of the object. The device control system includes an obtaining unit configured to obtain, from the detecting apparatus, information relating to an illuminance in the predetermined space; and a control unit configured to control, when the illuminance in the predetermined space falls below a first targeted illuminance, the illuminating apparatus so that the illuminance in the predetermined space becomes a second targeted illuminance that is greater than the first illuminance.

9 Claims, 28 Drawing Sheets

(52) U.S. Cl.
CPC ..... *H05B 37/0218* (2013.01); *H05B 37/0272* (2013.01); *F24F 2011/0035* (2013.01)

(56) References Cited

FOREIGN PATENT DOCUMENTS

| | | |
|---|---|---|
| JP | 4340925 | 10/2009 |
| JP | 4747529 | 8/2011 |
| JP | 2016-066603 | 4/2016 |

* cited by examiner

| a11 | a12 | a13 | b11 | b12 | b13 | c11 | c12 | c13 |
|---|---|---|---|---|---|---|---|---|
| a21 | a22 | a23 (x11) | b21 | b22 | b23 | c21 (x12) | c22 | c23 |
| a31 | a32 | a33 | b31 | b32 | b33 | c31 | c32 | c33 |
| d11 | d12 | d13 | e11 | e12 | e13 | f11 | f12 | f13 |
| d21 | d22 | d23 (x21) | e21 | e22 | e23 | f21 (x22) | f22 | f23 |
| d31 | d32 | d33 | e31 | e32 | e33 | f31 | f32 | f33 |

HALLWAY Y

FIG.8A

| HEAT SOURCE | LIGHT LEVEL |
|---|---|
| 1 | AUTOMATIC |
| 0 | 0% |

FIG.8B

| TARGETED ILLUMINANCE [lux] | MARGIN [lux] |
|---|---|
| P | M |

FIG.8C

| TEMPERATURE GAP + HUMIDITY / POPULATION DENSITY(%) | ... | −T1 °C TO −T2 °C HUMIDITY H < 1% | −T1 °C TO −T2 °C HUMIDITY H ≧ 1% | ... |
|---|---|---|---|---|
| 80 TO 100 | ... | −1 °C | −1 °C | ... |
| 60 TO 79 | ... | TARGET | TARGET | ... |
| 20 TO 59 | ... | +1 °C | DRY | ... |
| 1 TO 19 | ... | +2 °C | DRY | ... |
| 0 | ... | OFF | OFF | ... |

FIG.9A

| APPARATUS ID OF SECOND CONTROL TARGET APPARATUS | AREA ID (APPARATUS ID OF FIRST CONTROL TARGET APPARATUS) |
|---|---|
| x11 | a12, a13, a22, a23, a32, a33, b11, b21, b31 |
| x12 | b13, b23, b33, c11, c12, c21, c22, c31, c32 |
| x21 | d12, d13, d22, d23, d32, d33, e11, e21, e31 |
| x22 | e13, e23, e33, f11, f12, f21, f22, f31, f32 |

FIG.9B

| APPARATUS ID OF FIRST CONTROL TARGET APPARATUS | APPARATUS ID OF DETECTING APPARATUS |
|---|---|
| a11, a12, a13, a21, a22, a23, a31, a32, a33 | a22 |
| b11, b12, b13, b21, b22, b23, b31, b32, b33 | b22 |
| ... | ... |
| f11, f12, f13, f21, f22, f23, f31, f32, f33 | f22 |

FIG.10A

| AREA ID | COORDINATES OF DIAGONAL VERTICES |
|---|---|
| a11 | (0, 0) TO (100, 100) |
| a21 | (0, 100) TO (100, 200) |
| a31 | (0, 200) TO (100, 300) |
| d11 | (0, 300) TO (100, 400) |
| ⋮ | ⋮ |

FIG.10B

| CELL ID | AREA ID |
|---|---|
| M001 | a11 |
| M002 | a21 |
| M003 | a21 |
| M004 | a31 |
| ⋮ | ⋮ |

FIG.12A

| 32 °C (a11) | 25 °C (a12) | 25 °C (a13) |
|---|---|---|
| 32 °C (a21) | 25 °C (a22) | 32 °C (a23) |
| 24 °C (a31) | 24 °C (a32) | 31 °C (a33) |

FIG.12B

| 1 | 0 | 0 |
|---|---|---|
| 1 | 0 | 1 |
| 0 | 0 | 1 |

FIG.13

| 1 | 0 | 0 | 0 | 0 | 1 | 0 | 0 | 0 |
|---|---|---|---|---|---|---|---|---|
| 1 | 0 | 1 | 0 | 0 | 1 | 0 | 0 | 0 |
| 0 | 0 | 1 | 0 | 0 | 1 | 0 | 0 | 1 |
| 0 | 0 | 0 | 0 | 0 | 1 | 0 | 0 | 1 |
| 0 | 0 | 0 | 0 | 0 | 1 | 0 | 0 | 1 |
| 0 | 0 | 0 | 0 | 0 | 0 | 0 | 0 | 0 |

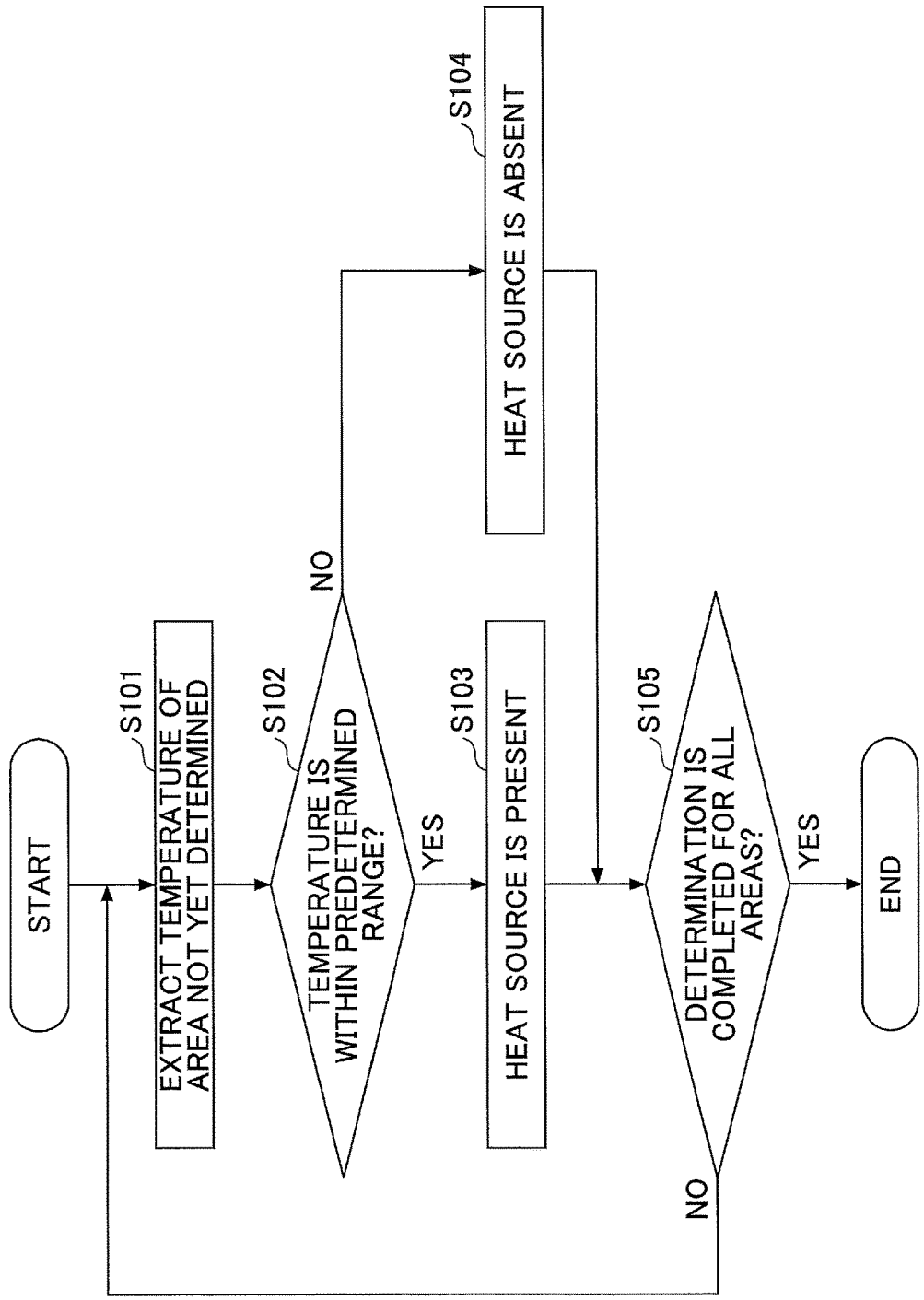

FIG.21A

| APPARATUS ID OF FIRST CONTROL TARGET APPARATUS | AREA ID |
|---|---|
| 1-1 | ... |
| 1-2 | ... |
| ⋮ | ⋮ |
| 1-7 | (2, 4) TO (8, 10) |
| ⋮ | ⋮ |

FIG.21B

| APPARATUS ID OF FIRST CONTROL TARGET APPARATUS | AREA ID | |
|---|---|---|
| | AUTOMATIC | 30% |
| 1-1 | ... | ... |
| 1-2 | ... | ... |
| ⋮ | ⋮ | ⋮ |
| 1-7 | (4, 6) TO (6, 8) | (2, 4) TO (8, 10) EXCEPT FOR (4, 6) TO (6, 8) |
| ⋮ | ⋮ | ⋮ |

DEVICE CONTROL SYSTEM, INFORMATION PROCESSING APPARATUS, AND NON-TRANSITORY RECORDING MEDIUM

CROSS-REFERENCE TO RELATED APPLICATIONS

The present application claims priority under 35 U.S.C. §119 to Japanese Patent Application No. 2016-047573 filed on Mar. 10, 2016, the contents of which are incorporated herein by reference in their entirety.

BACKGROUND OF THE INVENTION

1. Field of the Invention

The disclosures herein generally relate to a device control system, an information processing apparatus, and a non-transitory recording medium.

2. Description of the Related Art

A system for automatically controlling an illumination lamp to turn ON/OFF the illumination lamp is known in the related art. In such a system, for example, the illumination lamp is automatically turned ON when the presence of a person is detected by a human detecting sensor such as an infrared sensor, and the illumination lamp is automatically turned OFF when the person has left. Comfort may be improved because the illumination lamp is turned ON without requiring a person to operate the illumination lamp, and power consumption may be reduced because the illumination lamp is turned OFF without requiring the person to operate the illumination lamp when the person is absent.

For example, Japanese Patent No. 4340925 discloses a technique not only for controlling an illuminating device to turn ON/OFF the illuminating device but also for controlling brightness of the illuminating device at the time of turning ON the illuminating device. Japanese Patent No. 4340925 discloses an illumination system that adjusts light so that an illuminance obtained by an illuminance sensor becomes a targeted illuminance.

SUMMARY OF THE INVENTION

It is a general object of at least one embodiment of the present disclosure to provide a device control system, an information processing apparatus, and a non-transitory recording medium that substantially obviate one or more problems caused by the limitations and disadvantages of the related art.

According to one aspect of the present disclosure, there is provided a device control system including a detecting apparatus configured to detect an object in a predetermined space, and an information processing apparatus configured to control an illuminating apparatus based on a detection result of the object. The device control system includes an obtaining unit configured to obtain, from the detecting apparatus, information relating to an illuminance in the predetermined space; and a control unit configured to control, when the illuminance in the predetermined space falls below a first targeted illuminance, the illuminating apparatus so that the illuminance in the predetermined space becomes a second targeted illuminance that is greater than the first targeted illuminance.

BRIEF DESCRIPTION OF THE DRAWINGS

FIG. 8A is a table describing an example of a first control guideline management table stored in a control guideline management DB according to the embodiment;

FIG. 8B is a table describing an example of a control parameter table stored in the control guideline management DB according to the embodiment;

FIG. 8C is a table describing an example of a second control guideline management table stored in the control guideline management DB according to the embodiment;

FIG. 9A is a table describing an example of a control area management table stored in a control area management DB according to the embodiment;

FIG. 9B is a table describing an example of an illuminance information management table stored in the control area management DB according to the embodiment;

FIG. 10A is a table describing an example of an area information table stored in an area information DB according to the embodiment;

FIG. 10B is a table describing an example of a cell/area correspondence table stored in a cell/area correspondence DB according to the embodiment;

FIG. 12A is a conceptual diagram illustrating an example of a temperature distribution detected a temperature distribution sensor according to the embodiment;

FIG. 12B is a conceptual diagram illustrating an example of heat source data that indicates presence/absence of a heat source according to the embodiment;

FIG. 13 is a diagram illustrating an example of heat source data obtained by synthesizing the heat source data transmitted from a plurality of first control target apparatuses each including the detecting apparatus according to the embodiment;

FIG. 14 is a flowchart illustrating an example of a method of generating the heat source data according to the embodiment;

FIG. 21A is a table illustrating an example of a first control guideline management table according to the embodiment;

FIG. 21B is a table illustrating another example of a first control guideline management table according to the embodiment;

DESCRIPTION OF THE PREFERRED EMBODIMENTS

In the following, an embodiment of the present disclosure will be described with reference to the accompanying drawings. The present disclosure has an object to provide a device control system that controls one or more devices and prevents comfort from being decreased.

Figure 1:
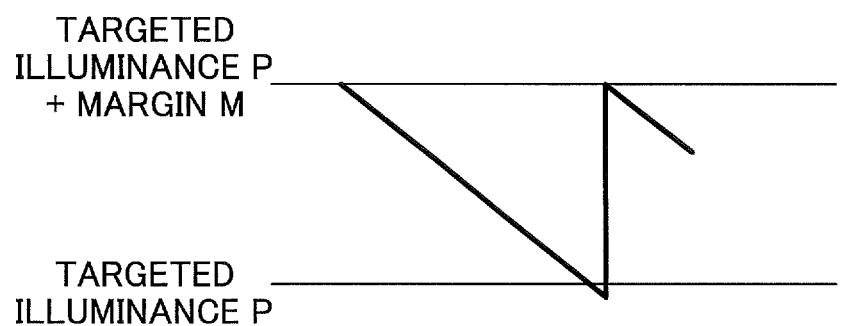
FIG. 1 is a diagram schematically describing an example of controlling illuminance of an illuminating apparatus by a device control system according to an embodiment.

FIG. 1 is a diagram schematically describing an example of controlling illuminance of an illuminating apparatus by a device control system according to an embodiment. FIG. 1 illustrates two thresholds that are a targeted illuminance P and the targeted illuminance P+a margin M. The device control system according to the embodiment control the illuminating apparatus so as to reduce the number of times for which the illuminance falls below the targeted illuminance P. Specifically, the device control system controls the illuminating apparatus as follows.

(i) When illuminance falls below the targeted illuminance P, the device control system controls the illuminating apparatus so that the illuminance becomes the targeted illuminance P+the margin M promptly.

(i) When the illuminance exceeds the targeted illuminance P+the margin M, the device control system controls the illuminating apparatus so that the illuminance becomes the targeted illuminance P+the margin M.

According to the control as described above, the illuminance is controlled to be the targeted illuminance P+the margin M even when the illuminance falls below the targeted illuminance P. Thus, it is possible to make the time, during which the illuminance is higher than the targeted illuminance P, longer and to reduce the number of times for which a state, in which the illuminance is lower than the targeted illuminance P, continues for a predetermined time. Even when the illuminance exceeds the targeted illuminance P+the margin M, the illuminance is not controlled to be the targeted illuminance P but controlled to be the targeted illuminance P+the margin M. Thus, similar effects can be obtained. Further, because the illuminance is not controlled until the illuminance falls below the targeted illuminance P, the number of times for which the illuminance is controlled can be reduced and occurrence of a flicker can be reduced.

According to the control as described above, although there is a possibility that electric power consumption increases because the time period, during which the illuminance is higher than the targeted illuminance P, continues for a long time. However, the increase of electric power consumption is slight for a highly efficient illuminating apparatus such as a LED. Accordingly, it is possible to enhance comfort while maintaining energy saving performance.

Terminology

A predetermined space is a space in which a person can be present. The predetermined space may be a room in which a plurality of persons can be present. The predetermined space may be referred to as a room. Specific examples of the predetermined space include an office, a factory, a seminar venue, an exhibition space, an indoor stadium, a restaurant, a train, a bus, a ship, and the like. However, the predetermined space is not limited to these. Also, the home of an individual may be the predetermined space as well.

An object to be detected or sensed by a detecting unit such as a sensor is mainly a living object. The object to be detected may be a non-living object such as a robot. The object may be an object that moves. In the description of the embodiment, the object is a human, for example.

A margin is a difference with respect to a targeted illuminance P. Alternatively, the margin may be referred to as a buffer zone for control. According to the embodiment, the targeted illuminance P+the margin M>the targeted illuminance P.

<Device Control System 100>

Figure 2:
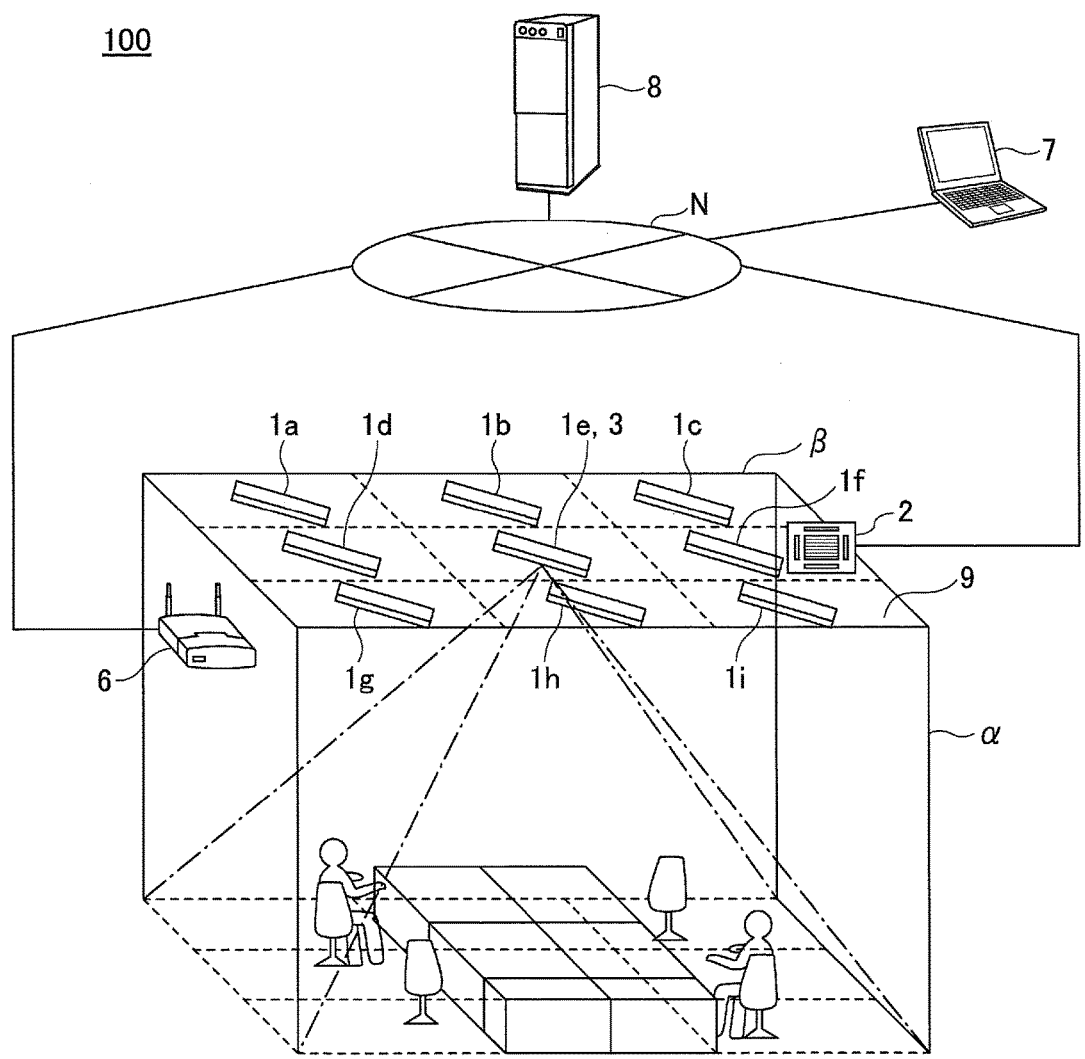
FIG. 2 is a diagram illustrating an example of a schematic configuration of the device control system according to the embodiment.

FIG. 2 is a diagram illustrating an example of a schematic configuration of a device control system 100 according to the embodiment. As illustrated in FIG. 2, the device control system 100 includes a plurality of first control target apparatuses 1a, 1b, 1c, 1d, 1e, 1f, 1g, 1h, and 1i to be controlled, a second control target apparatus 2 to be controlled, a wireless router 6, an administrator (manager) personal computer (PC) 7, and a management system 8, which are coupled in a communicative manner through a communication network N. The first control target apparatuses 1a to 1i and the second control target apparatus 2 are installed on a ceiling β side of a room α that is an example of a predetermined space. Note that in the following descriptions, an arbitrary first control target apparatus among the plurality of first control target apparatuses 1a, 1b, 1c, 1d, 1e, 1f, 1g, 1h, and 1i may generically be referred to as the "first control target apparatus 1".

As illustrated in FIG. 2, the ceiling β is divided into nine areas 9. The first control target apparatuses 1a to 1i are respectively installed in the nine-partitioned areas of the ceiling β. A detecting apparatus 3 is provided in the first control target apparatus 1e set in the center area of the ceiling β. For example, each area 9 may be a square each side of which is in a range from 50 cm to several meters. However, the size of the areas 9 is not particularly limited and may be determined in accordance with a size and performance of the first control target apparatus 1. Note that each of the areas 9 into which the ceiling β is divided may have a different size, and may be a shape, which is not the square. Also, the areas 9, into which the ceiling β is divided, do not necessarily have to be the same size and each of the areas 9 does not necessarily have to be a square. For example, the areas 9 may be arranged to be other polygons such as hexagons in which case the distances between the first control target apparatuses 1 may be equal as in the case of arranging the areas 9 to be squares.

The second control target apparatus 2 is installed at a suitable interval from the ceiling β. Although one second control target apparatuses 2 is illustrated in FIG. 2, a plurality of second control target apparatuses 2 are installed in the room α as described later below. Also, although the second control target apparatuses 2 are preferably installed at equal intervals, the second control target apparatuses 2 do not necessarily have to be installed at equal intervals. The number of first control target apparatuses 1 is different from the number of second control target apparatuses 2 because of the different ranges that can be covered by the first control target apparatus 1 and the second control target apparatus 2, the difference in size of the first control target apparatus 1 and the second control target apparatus 2, and the difference in cost of the first control target apparatus 1 and the second control target apparatus 2. The number of first control target apparatuses 1 and the number of second control target apparatuses 2 may be arbitrarily determined. In the case where a plurality of second control target apparatuses 2 are provided, the second control target apparatuses 2 may be individually referred to as the second control target apparatus 2a, 2b and 2c, and generically referred to as the "second control target apparatus 2".

The first control target apparatus 1 according to the embodiment is an illuminating apparatus as a fluorescent-shaped light emitting diode (LED). The detecting apparatus 3 of the first control target apparatus 1e uses a thermopile function to detect a temperature distribution in the room α, which is divided into a plurality of areas (i.e., nine areas), and transmits, to the management system 8, heat source data indicating the presence or absence of a heat source. In other words, the heat source data may indicate a detection result of an object. A wireless LAN or the like may be used to transmit the heat source data. However, the heat source data may also be transmitted by wire, for example. A floor of the room α is a place where a person or the like that is an object to be detected as a heat source is present. In other words, the device control system 100 may include the detecting apparatus 3, which detects an object in a predetermined space, and the management system 8, which controls the first control target apparatus 1 based on a detection result of the object.

According to the embodiment, the second control target apparatus is an air conditioning apparatus such as an air-conditioner. Note that FIG. 2 illustrates indoor equipment. The outdoor equipment of the second control target apparatus 2 may be installed in a predetermined location provided for each second control target apparatus 2 or commonly provided for a plurality of second control target apparatuses 2. In FIG. 2, the second control target apparatus 2 and the management system 8 are coupled by wire, but in other embodiments, the second control target apparatus 2 and the management system 8 may communicate wirelessly.

The wireless router 6 receives the heat source data, transmitted from the detecting apparatus 3, and transmits the received data to the management system 8 via the communication network N. The communication network N may be structured (implemented) by a local area network (LAN), and may include the Internet.

As described later below, the management system 8 has functions of an information processing apparatus and may be referred to as a server. Based on the heat source data transmitted from the wireless router 6, the management system 8 generates control data for controlling the first control target apparatus 1 and the second control target apparatus 2, and transmits the generated control data to the first control target apparatus 1 and the second control target apparatus 2. The first control target apparatus 1 controls a light level (amount of light) of the LED based on the control data. The second control target apparatus 2 controls temperature, humidity, air flow power, and air flow direction based on the control data. Accordingly, the management system 8 controls both illumination and air conditioning to provide a space that is comfortable for one or more persons in the room while achieving energy conservation.

As described above, the first control target apparatus 1e, on which the detecting apparatus 3 is mounted, not only detects the temperature distribution within the room α but also controls the light level of its own LED. The first control target apparatus 1e, which has the detecting apparatus 3, has functions similar to the functions of the other first control target apparatuses 1.

The detecting apparatus 3 may be installed inside or close to the second control target apparatus 2. Further, the detecting apparatus 3 may be installed separately from the first control target apparatus 1 or the second control target apparatus 2. However, when the detecting apparatus 3 is integrated with the first control target apparatus 1e, the detecting apparatus 3 may be easily installed and removed, and a space for installing the detecting apparatus 3 may not be necessary.

The administrator PC 7 is a PC that an administrator (manager) of the device control system 100 operates. The administrator PC 7 communicates with the management system 8 to perform various settings and displays detection data for each area. The administrator may be referred to as a user, a setter of the device control system 100, or the like.

<Schematic Configuration of First Control Target Apparatus 1>

Figure 3:
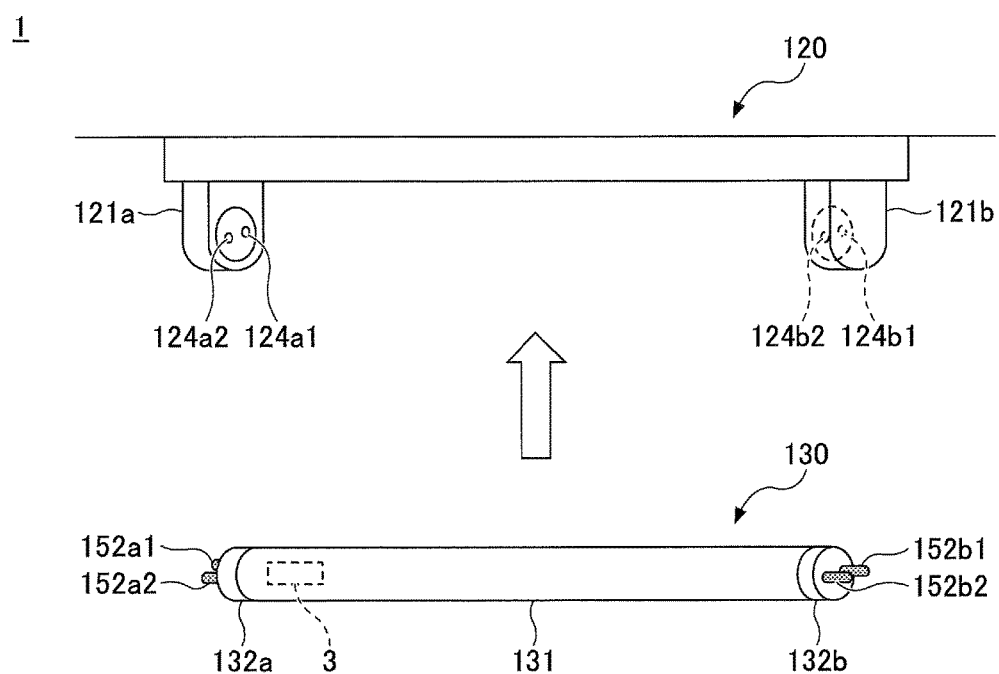
FIG. 3 is an exterior perspective view of an example in a case where a first control target apparatus is a fluorescent LED lighting device according to the embodiment.

The first control target apparatus 1 and a main body 120, on which the first control target apparatus 1 is mounted, are described below with reference to FIG. 3. FIG. 3 is an exterior perspective view of an example in a case where the first control target apparatus 1 is a fluorescent LED lighting device.

As illustrated in FIG. 3, the first control target apparatus 1 as the florescent LED lighting device includes a straight tube LED lamp 130 to be mounted on the main body 120 installed around the center of the ceiling β of the room α. The main body 120 has a socket 121a and a socket 121b at the respective ends. The socket 121a includes two power supply terminals 124a1 and 124a2 that supply electric power to the LED lamp 130 when the LED lamp 130 is housed in the main body 120.

The socket 121b also includes two power supply terminals 124b1 and 124b2 that supply electric power to the LED lamp 130 when the LED lamp 130 is housed in the main body 120. In this way, the main body 120 can supply electric power from a power supply to the LED lamp 130.

The LED lamp 130 includes a translucent cover 131 and caps 132a and 132b that are provided at the respective end portions of the translucent cover 131. The first control target apparatus 1e includes the detecting apparatus 3 placed along the translucent cover 131, inside the translucent cover 131, or adjacent to the translucent cover 131. The translucent cover 131 may be made of, for example, resin material such as acrylic resin. The translucent cover 131 covers a light source provided inside.

The cap 132a has terminal pins 152a1 and 152a2, which are respectively coupled to the power supply terminals 124a1 and 124a2 of the socket 121a. The cap 132b has terminal pins 152b1 and 152b2, which are respectively coupled to the power supply terminals 124b1 and 124b2 of the socket 121b. As the LED lamp 130 is housed inside the main body 120, it is possible to supply electric power to the LED lamp 130 from each of the terminal pins 152a1, 152a2, 152b1, and 152b2, via the power supply terminals 124a1, 124a2, 124b1, and 124b2 of the main body 120. The LED lamp 130 emits light to the outside through the translucent cover 131. The detecting apparatus 3 is operated with the electric power supplied from the main body 120.

<Hardware Configurations of Detecting Apparatus 3, First Control Target Apparatus 1, and Second Control Target Apparatus 2>

Figure 4A:
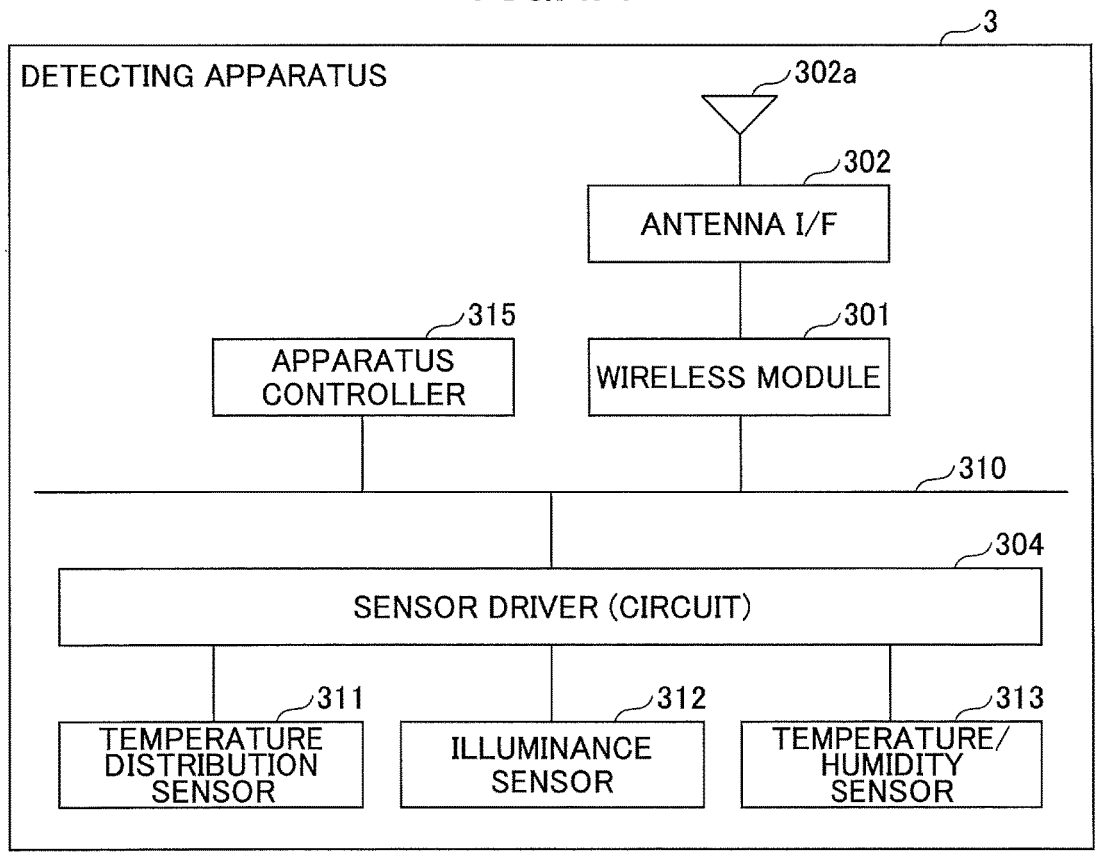
FIG. 4A is a block diagram illustrating an example of a hardware configuration of a detecting apparatus according to the embodiment.

A hardware configuration of the detecting apparatus 3 will be described with reference to FIG. 4A. FIG. 4A is a block diagram illustrating an example of the hardware configuration of the detecting apparatus 3 according to the embodiment. The detecting apparatus 3 includes a wireless module 301, an antenna I/F (interface) 302, an antenna 302a, a sensor driver 304, a temperature distribution sensor 311, an illuminance sensor 312, a temperature/humidity sensor 313, an apparatus controller 315, and a bus line 310, such as an address bus and/or a data bus, for electrically coupling the above hardware elements.

The wireless module 301 is a component for establishing wireless communication. The wireless module 301 establishes the wireless communication with an external device via the antenna I/F 302 and the antenna 302a. The wireless module 301 may establish communication based on a communication system, such as Bluetooth (registered trademark), WiFi, ZigBee, or ARIB STD-T108 (920 MHz band used for telemeters or telecontrol). Note that the communication system may not only be based on wireless communication but also based on wired communication using Ethernet or Power Line Communications (PLC). The wireless module 301 operates under control of a communication control program that the apparatus controller 315 executes.

The temperature distribution sensor 311 is a thermal detecting element that detects infrared rays to detect a temperature distribution in the room α. Because the thermal detecting element can be used to detect a surface temperature of an object or a human, it is possible to detect a temperature of a location (area) close to the human. The thermal detecting element has an absorptive layer that absorbs light to convert the light into heat, and outputs, to the outside, the change of the temperature of the absorptive layer as an electric signal. The thermal detection element may be a thermopile, a bolometer, a pyroelectric element, a diode with voltage-current characteristics that changes, or the like. In the descriptions of the embodiment, the temperature distribution sensor 311 uses a thermopile to detect the temperature distribution. Note that the temperature distribution sensor 311 has a plurality of thermopile sensors to detect a temperature for each detection cell as described later below.

The illuminance sensor 312 is a sensor that detects brightness (illuminance) in the room α. The temperature/humidity sensor 313 is a sensor that detects temperature and humidity around the detecting apparatus 3 in the room α. The temperature detected by the temperature/humidity sensor 313 is used for conversion from temperature/humidity at the ceiling surface into an amount of water vapor. The humidity at the floor surface is calculated from the temperature at the floor surface detected by the thermopile and the amount of water vapor.

The sensor driver 304 is an interface (hardware circuit) for the temperature distribution sensor 311, the illuminance sensor 312, and the temperature/humidity sensor 313. The sensor driver 304 converts instructions, transmitted from the apparatus controller 315, for driving the temperature distribution sensor 311, the illuminance sensor 312, and the temperature/humidity sensor 313 into commands that are appropriate for the respective sensors 311 to 313, and transmits the commands to the respective sensors 311 to 313. In other words, the apparatus controller 315 may control the sensor driver 304 to drive the temperature distribution sensor 311, the illuminance sensor 312, and the temperature/humidity sensor 313. Further, the sensor driver 304 transmits converts signals, detected (output) by the respective sensors 311 to 313, into signals that are used by the apparatus controller 315, and transmits the signals to the apparatus controller 315.

The apparatus controller 315 is a control apparatus that controls the entire detecting apparatus 3. The apparatus controller 315 is an information processing apparatus such as a microcomputer that includes a CPU, ROM, RAM, and the like to execute at least one program. Alternatively, the apparatus controller 315 may be structured with hardware such as IC. For example, the apparatus controller 315 may control timings at which the temperature distribution sensor 311, the illuminance sensor 312, and the temperature/humidity sensor 313 detects the temperature and the like, ad may process data detected (output) by each of the sensors 311 to 313. For example, the apparatus controller 315 generates, based on temperature distribution data output from the temperature distribution sensor 311, heat source data that indicates presence or absence of heat source. The apparatus controller 315 transmits, to the management system 8, detection data including the heat source data.

Figure 4B:
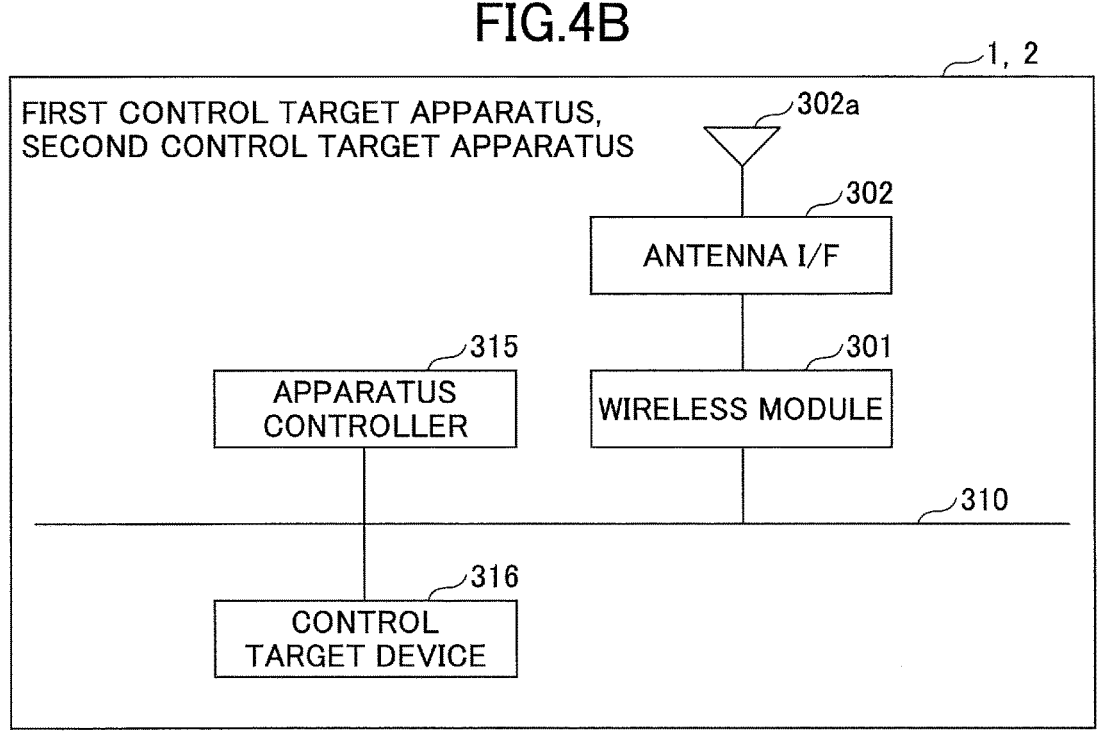
FIG. 4B is a block diagram illustrating an example of a hardware configuration of the first control target apparatus and a second control target apparatus 2 according to the embodiment.

FIG. 4B is a block diagram illustrating an example of a hardware configuration of the first control target apparatus 1 or the second control target apparatus 2 according to the embodiment. The apparatus controller 315 of the first control target apparatus 1 controls the light level of the LED based on control data transmitted from the management system 8. The apparatus controller 315 of the second control target apparatus 2 controls air conditioning based on control data transmitted from the management system 8.

The apparatus controller 315, the antenna I/F 302, and the wireless module 301 of the first control target apparatus 1 or the second control target apparatus 2 in FIG. 4B are substantially identical to those FIG. 4A. The first control target apparatus 1 or the second control target apparatus 2 includes a control target device 316 to be controlled. The control target device 316 of the first control target apparatus 1 may be the LED lamp 130 and/or a control circuit of the LED lamp 130. The control target device 316 of the second control target apparatus 2 may be a heat pump, a compressor, and/or a control circuit of an air conditioner.

Note that in the first control target apparatus 1e including the detecting apparatus 3, the apparatus controller 315, the antenna I/F 302, and the wireless module 301 may be commonly used by the detecting apparatus 3 and the first control target apparatus 1e. In this way, it is possible to reduce the number of components of the detecting apparatus 3.

<Hardware Configuration of Management System 8>

Figure 5:
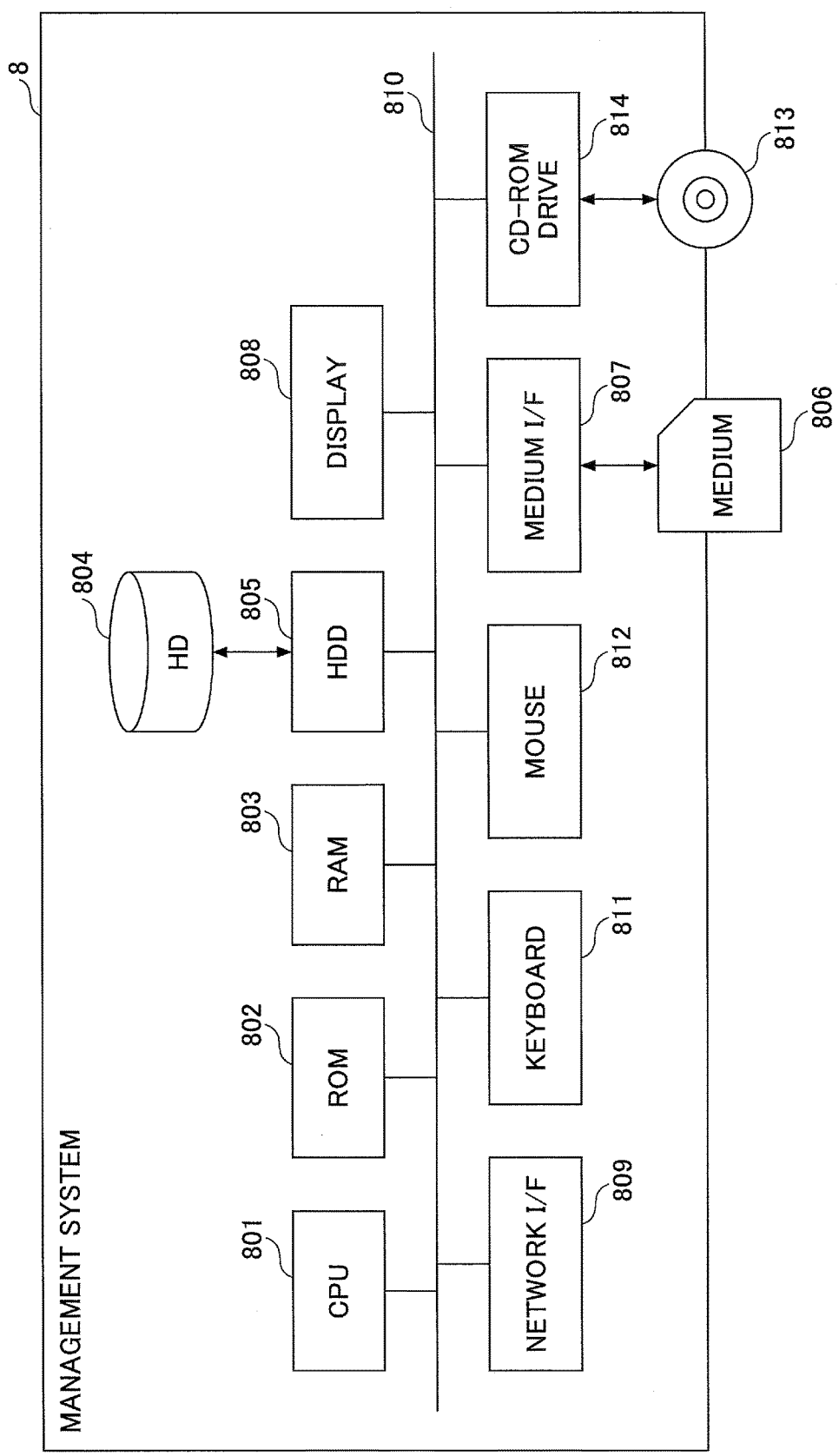
FIG. 5 is a block diagram illustrating an example of a hardware configuration of a management system according to the embodiment.

A hardware configuration of the management system 8 will be described. FIG. 5 is a block diagram illustrating an example of the hardware configuration of the management system 8 according to the embodiment.

The management system 8 is configured as an information processing apparatus. The management system 8 includes a CPU 801 that controls the overall operations of the management system 8, a ROM 802 that stores at least one program such as an Initial Program Loader (IPL) used for driving the CPU 801, and a RAM 803 that is used as a work area of the CPU 801. The management system 8 further includes a hard disk (HD) 804 that stores various kinds of data such as a management program, and a hard disk drive (HDD) 805 that controls reading/writing of various kinds of data from/to the HD 804 under control of the CPU 801. The management system 8 further includes a medium I/F (interface) 807 that controls reading/writing (storing) of data from/to a medium 806 such as a flash memory, a display 808 that displays various kinds of information such as a cursor, a menu, a window, characters, and/or an image, and a network I/F (interface) 809 for using the communication network N to establish data communication. The management system 8 further includes a keyboard 811 that includes a plurality of keys for inputting characters, numeric values, and various instructions, a mouse 812 for selecting and executing various instructions, selecting an object to be processed, moving a cursor, and the like, a Compact Disc Read Only Memory (CD-ROM) drive 814 that controls reading/writing various kinds of data from/to a CD-ROM 813 as an example of a removable recording medium, and a bus line 810 such as an address bus or a data bus for electrically coupling the above described elements.

The hardware configuration of the management system 8 illustrated FIG. 5 does not have to be housed in one housing or does not have to be provided as a unitary apparatus. FIG. 5 illustrates preferable hardware elements that the management system 8 includes. In order to deal with cloud computing, the physical configuration of the management system 8 according to the embodiment does not have to be a fixed configuration but may be a configuration in which hardware resources are dynamically coupled and uncoupled in accordance with a load.

Note that the management program to be executed by the management system 8 may be stored in a storage medium, such as the medium 806 or the CD-ROM 813, in an executable format or a compressed format and distributed in such a state. The management program may also be distributed by a server for distributing the program.

Further, a hardware configuration of the administrator PC 7 is similar to the hardware configuration of the management system 8. If the hardware configuration of the administrator PC 7 is different from the hardware configuration of the management system 8, the difference is not important in describing the embodiment.

<Functional Configuration of Management System 8>

Figure 6:
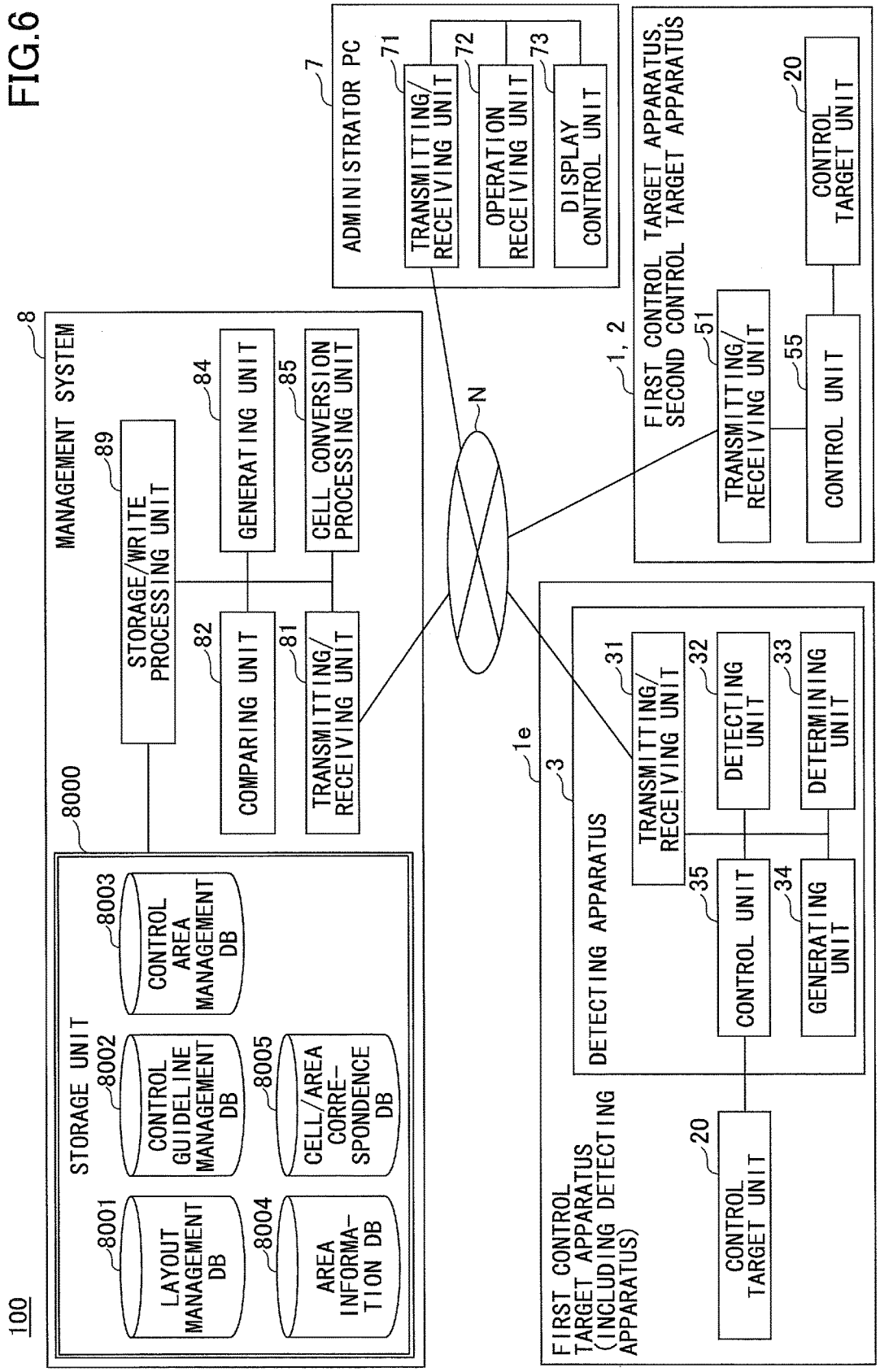
FIG. 6 is a block diagram illustrating an example of a functional configuration of the device control system according to the embodiment.

Referring now to FIG. 6, functional configurations of the first control target apparatus 1e, which includes the detecting apparatus 3, the first control target apparatus 1, which does not include the detecting apparatus 3, the second control target apparatus 2, the administrator PC 7, and the management system 8 will be described according to the embodiment of the present invention. FIG. 6 is a block diagram illustrating an example of the functional configuration of the device control system 100 according to the embodiment.

<Functional Configuration of First Control Target Apparatus 1e>

The first control target apparatus 1e includes a control target unit 20 and functions of the detecting apparatus 3. The detecting apparatus 3 includes a transmitting/receiving unit 31, a detecting unit 32, a determining unit 33, a generating unit, and a control unit 35. These units (elements) are functions or units that are implemented by instructions that the apparatus controller 315 illustrated in FIG. 4A outputs according to at least one program. For example, the control target unit 20 may be implemented by the LED lamp 130 whose light level (amount of light) is to be controlled.

The transmitting/receiving unit 31 of the detecting apparatus 3 is a unit or a function implemented by operations of the apparatus controller 315 and the wireless module 301. For example, the transmitting/receiving unit 31 exchanges various kinds of data with the management system 8 via the communication network N.

The detecting unit 32 is a unit or a function implemented by operations of the temperature distribution sensor 311, the illuminance sensor 312, and the temperature/humidity sensor 313. The detecting unit 32 detects the temperature distribution, the illuminance, and the temperature/humidity at each area 9 within the predetermined space.

The determining unit 33 is a unit or a function implemented by the apparatus controller 315 operating. For example, the determining unit 33 determines whether temperature of the area 9 is within a predetermined range (e.g., 30 to 35 C).

The generating unit 34 is a unit or a function implemented by the apparatus controller 315 operating. For example, the generating unit 34 generates heat source data that indicates presence or absence of a heat source based on a determination result of the determining unit 33.

The control unit 35 is a unit or a function implemented by the apparatus controller 315 operating. For example, the control unit 35 generates, based on control data transmitted from the management system 8, a control signal to be output to the control target unit 20.

<Functional Configurations of First Control Target Apparatus 1 without Detecting Apparatus 3 and Second Control Target Apparatus 2>

Next, functional configurations of the first control target apparatus 1, without the detecting apparatus, and the second control target apparatus 2 will be described. The first control target apparatus 1, which does not have the detecting apparatus 3, and the second control target apparatus 2 include a transmitting/receiving unit 51, a control unit, 55, and a control target unit 20. The transmitting/receiving unit 51 is a unit or a function implemented by operations of the apparatus controller 315 and the wireless module 301, for example. The transmitting/receiving unit 51 exchanges various kinds of data with the management system 8 via the communication network N.

The control unit 55 is a unit or a function implemented by the apparatus controller 315 operating. The control unit 55 generates, based on control data transmitted from the management system 8, a control signal to be output to the control target unit 20.

The control target unit 20 of the first control target apparatus 1 may be implemented by the LED lamp 130 whose light level (amount of light) is to be controlled. The control target unit 20 of the second control target apparatus 2 may be implemented by a heat pump and/or a compressor of an air conditioner.

<Functional Configuration of Management System 8>

A functional configuration of the management system 8 will be described. The management system 8 includes a transmitting/receiving unit 81, a comparing unit (collating unit) 82, a generating unit 84, a cell conversion processing unit and a storage/read processing unit 89. These elements are functions or units that are implemented by operating under instructions from the CPU 801 in accordance with the management program read from the HD 804 into the RAM 803 illustrated in FIG. 5. Furthermore, the management system 8 includes a storage unit 8000, which is structured with the RAM 803 and the HD 804 illustrated in FIG. 5. The storage unit 8000 stores therein a layout management database (DB) 8001, a control guideline management DB 8002 a control area management DB 8003, an area information DB 8004, and a cell/area correspondence DB 8005. These data bases will be described.

(Layout Management DB 8001)

The layout management DB 8001 will be described with reference to FIGS. 7A and 7B. In the layout management DB 8001, layout information for the first control target apparatus 1 and the second control target apparatus 2 is managed as illustrated in FIG. 7A.

Figures 7A, 7B:
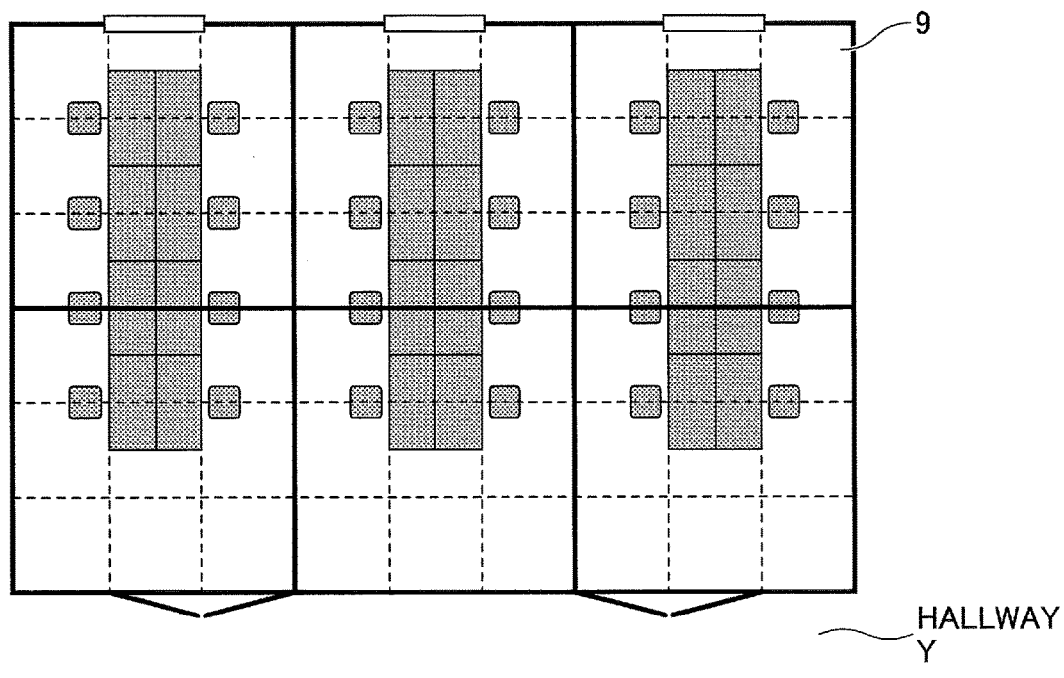
FIG. 7A is a diagram describing an example of layout information stored in a layout management DB according to the embodiment.
FIG. 7B is conceptual diagram of an example of the layout information for a room stored in the layout management DB according to the embodiment.

As illustrated in FIG. 7A, for example, the layout information is managed so that one room α is divided into 54 areas and an apparatus ID for identifying a first control target apparatus 1 as a LED lighting device is associated with each divided area. The layout information of FIG. 7A thus manages association between the partitioned area and the apparatus ID in that area. Each of the apparatus IDs a11 to f33 is represented by a combination of an alphabet (a, b, c, d, e, or f) and a two-digit number. Among these apparatus IDs, the nine areas 9 on the upper left side illustrated in FIG. 7A having apparatus IDs starting with the alphabet "a" correspond to the nine areas 9 illustrated in FIG. 1. That is, FIG. 2 illustrates a part of the room α. The actual room α has six blocks having apparatus IDs starting with a, b, c, d, e, and f. Each of the six blocks is divided into nine areas, and thus the room α is divided into 54 areas in total. Note that the division as described above is just an example, and the room may be divided into any desired number of blocks. Similarly, it is possible to divide one block into a number of areas other than nine.

In FIG. 7A, a combination of the alphabet "x" and a two-digit number represents an apparatus ID of a second control target apparatus 2. In other words, the apparatus IDs x11, x12, x21, and x22 are apparatus IDs for identifying the second control target apparatuses 2. Although the second control target apparatuses 2 with the apparatus IDs x12, x21, x22 are not illustrated in FIG. 2, they are disposed on the ceiling β as illustrated in FIG. 7A. That is, four air conditioners are mounted on the ceiling β of the room α.

Note that an ID may be a name, a symbol, a character string, a numerical value, or a combination thereof used for uniquely distinguishing a specific object from a plurality of objects. The ID may also be referred to as identification information or an identifier. Similarly, IDs described in the following may be names, symbols, character strings, numerical values, or combinations thereof used for uniquely distinguishing specific objects. Specifically, the apparatus ID may be a combination of serial numbers that do not overlap with a room number, a simple serial number, an apparatus serial number, or the like. However, the apparatus ID is not limited to this.

According to the embodiment, one first control target apparatus 1 is installed in each area 9. Thus, the apparatus ID of the first control target apparatus 1 may be used as identification information for identifying the area 9.

FIG. 7B is a conceptual diagram of layout information for the room α. The respective areas 9 of the layout information illustrated in FIG. 7A correspond to the areas 9 divided by dashed lines and solid lines on the layout of the actual room α illustrated in FIG. 7B. FIG. 7B illustrates an actual layout in which desks and chairs are arranged. In FIG. 7B, the room α is divided into 54 areas similarly to FIG. 7A. That is, positions of the areas 9 in FIG. 7B respectively correspond to positions of the areas 9 in FIG. 7A. In FIG. 7B, the lower side corresponds to a side toward a hallway Y, and the upper side corresponds to a side toward windows.

(Control Guideline Management DB 8002)

The control guideline management DB 8002 will be described below with reference to FIG. 8A. In the control guideline management DB, a first control guideline management table as illustrated in FIG. 8A is managed. In the first control guideline management table, control contents for the control target unit 20 are managed in association with heat source fields. For example, when the heat source field is "1", it indicates that a person is present in the area 9. In this case, the LES's light level is set to "automatic" in the first control guideline management table so that person can work comfortably while maintaining energy saving performance. On the other hand, when the heat source field is "0", it indicates that there is no heat source and no one is present in the area 9. In this case, the LED's light level is set to be "0%" to realize the energy saving performance. Note that 0% is an example of the light level for increasing the energy saving performance, and the present disclosure is not limited to this. For example, the light level may be set to be in between 10% to 60% when the heat source is not present in the area 9. Further, the light level may be set to be "automatic" similar to the case where the heat source is present so that a targeted illuminance P is set to be smaller than that of the case where the heat source is present. In other words, the light level for the case where the heat source is not present may be lower than the light level for the case where the heat source is present.

Further, a control guideline management table may be set for each area 9 or each first control target apparatus 1. This example will be described later below. In this way, the management system 8 can control the first control target apparatuses 1 based on different control guidelines.

Control parameters in the case where the light level is "automatic" will be described. In the control guideline management table, a control parameter table as illustrated in FIG. 8B is managed. In the control parameter table, a targeted illuminance is set in association with a margin.

Although both values are in lux, another unit may be used. In the following description of the embodiment, the targeted illuminance is P and the margin is M. Note that an administrator or the like may set the targeted illuminance P and the margin M via the administrator PC 7.

Further, in the control guideline management DB 8002, a second control guideline management table as illustrated in FIG. 8C is managed. In the second control guideline management table, each control guideline for controlling air conditioning is associated with a population density range (human density range) and a set of "temperature gap+ humidity". The temperature gap is a difference between a targeted temperature of when the second control target apparatus 2 controls the temperature and a temperature detected by the temperature distribution sensor 311. According to the second control guideline management table of FIG. 8C, for example, when the population density is in between 1% to 19%, the temperature gap is in a range from $-T1°$ C. to $-T2°$ C. with respect to the targeted temperature, and the humidity is less than H1%, the second control target apparatus 2 is controlled to increase the temperature by $+2°$ C. with respect to the target temperature. When the humidity is greater than or equal to H1% with the same temperature gap ($-T1°$ C. to $-T2°$ C.) and the same population density (1% to 19%), the second control target apparatus 2 is controlled to operate in dry mode.

As illustrated in FIG. 8C, a control guideline for controlling air conditioning is set for each population density range depending on a combination of temperature gap and humidity. In this way, the management system 8 can perform fine and detailed air conditioning control. For example, if the population density is high, the management system 8 can control the second control target apparatus 2 before the persons in the area 9 feels discomfort due to increase of the temperature and/or a change of the humidity in the area 9 by the body heat of the persons. That is, the management system 8 can perform feedforward control. Thus, comfort may be further improved.

Note that the above described manner in which the population density ranges are divided is merely one example. For example, the population density may be subdivided into finer ranges, or the population density ranges may be divided into unequal ranges. The population density may be calculated based on the number of areas in which a heat source is detected among the plurality of areas of the control range of the second control target apparatus 2 (see FIGS. 9A and 9B).

(Control Area Management DB 8003)

The control area management DB 8003 will be described with reference to FIG. 9A. In the control area management DB 8003, a control area management table as illustrated in FIG. 9A is managed. In the control area management table, each apparatus ID of the second control target apparatus 2 is managed in association with area IDs. The area IDs are the apparatus IDs of the first control target apparatus 1. As can be expected from FIG. 7A, the apparatus ID of each second control target apparatus 2 is associated with the area IDs of a 3×3 block of areas 9 centered around the second control target apparatus 2. In other words, each second control apparatus's ID may be associated with nine area IDs.

Note that the 3×3 block is just an example, and a 4×4 block may be associated with the apparatus ID of each second control target apparatus 2, for example. Also, each area 9 may be associated with the second control target apparatus 2 that is closest thereto.

Further, in the control area management DB 8003, an illuminance information management table as illustrated in FIG. 9B is managed. In the illuminance information management table, the apparatus IDs of the detecting apparatuses 3 (which may be described as the apparatus IDs of the first control target apparatuses 1 in the embodiment) are managed in association with the apparatus IDs of the first control target apparatuses 1. The illuminance information management table illustrates, for each detecting apparatus 3, which detects illuminance data, first control target apparatuses 1, of which light levels are controlled based on the illuminance data detected by the corresponding detecting apparatus 3, when the light levels of the first control target apparatuses 1 are automatically controlled. For example, illuminance data, detected by the detecting apparatus 3 (nearest detecting apparatus) included in the first control target apparatus 1e with the apparatus ID a22, is used for controlling the light levels of the first control target apparatuses 1 with apparatus IDs a11, a12, a13, a21, a22, a23, a31, a32, and a33. The present disclosure is not limited to the association (correspondence) as described above. For example, average illuminance data of two or more detecting apparatuses 3 may be used to control the light level(s).

(Area Information DB 8004)

The area information DB 8004 will be described with reference to FIG. 10A. In the area information DB 8004, an area information table as illustrated in FIG. 10A is managed. In the area information table, coordinate information on coordinates of each area 9 is registered in association with an area ID of a corresponding area. For example, the coordinates of each area 9 may be coordinates of diagonal vertices. Based on the area information table as illustrated in FIG. 10A, the management system 8 can determine where each area starts and ends. For example, the area 9 with area ID a11 is a square on 100 cm in X direction and Y direction from coordinates (0, 0) to coordinates (100, 100). Note that this size of the area is just an example.

(Cell/Area Correspondence DB 8005)

The cell/area correspondence DB 8005 will be described with reference to FIG. 10B. In the cell/area correspondence DB 8005, a cell/area correspondence table as illustrated in FIG. 10B is managed. The cell/area correspondence table is a table that associates detection cells with respective areas 9. Thus, in the cell/area correspondence table, area IDs are registered in association with respective cell IDs. The cell IDs are IDs for identifying the respective detection cells. For example, each cell ID may be a combination of a unique number, an ID of a first control target apparatus 1, a numeric value, and an alphabet. Although one cell ID is associated with one area ID, one area ID may be associated with a plurality of cell IDs.

(Functional Configuration of Management System 8)

Referring back to FIG. 6, a functional configuration of the management system 8 will be described. The transmitting/receiving unit 81 illustrated in FIG. 6 may receive and obtain detection data from the detecting apparatus 3 and transmit control data to the detecting apparatus 3, for example. In other words, the transmitting/receiving unit 81 may obtain, from the detecting apparatus 3, information relating to an illuminance in a predetermined space.

The comparing unit 82 compares (collates) the layout information as illustrated in FIG. 7A with heat source data as illustrated in FIG. 13 (described later below), for example. In this way, the presence/absence of a person in each area 9 is determined. In other words, it is determined for each area 9 that whether a person is present.

The generating unit 84 refers to the comparison result of the comparing unit 82 and the first control guideline management table to generate control data indicating the light level (amount of light) for the first control target apparatus 1. Further, the generating unit 84 refers to the comparison result of the comparing unit 82 and the second control guideline management table to generate control data for the air conditioner for the second control target apparatus 2 based on heat source data and humidity data detected by the temperature/humidity sensor 313, for example. In other words, the generating unit 84 controls the first target apparatus 1 so as to change the illuminance in the room α.

The cell conversion processing unit 85 converts the heat source data transmitted from the temperature distribution sensor 311 into heat source data for the area 9 of the room α. Details of this will described later below.

The storage/write processing unit 89 reads data from the storage unit 8000 or stores data in the storage unit 8000, for example.

<Functional Configuration of Administrator PC 7>

The administrator PC 7 includes a transmitting/receiving unit, an operation receiving unit 72, and a display control unit 73. These elements are functions or units that are implemented by operating under instructions from the CPU 801 in accordance with the management program read from the HD 804 into the RAM 803 illustrated in FIG. 5.

The transmitting/receiving unit 71 of the administrator PC 7 is a unit or a function implemented by operations of the network I/F 809 and the like instructions from the CPU 801. For example, the transmitting/receiving unit 71 exchanges various kinds of data with the management system 8 via the communication network N.

The operation receiving unit 72 is a unit or a function implemented by operations of the keyboard 811, the mouse 812, and the like and instructions from the CPU 801. The operation receiving unit 72 receives various operations to the administrator PC 7 of the administrator.

The display control unit 73 is a unit or a function implemented by operations of the display 808 and the like and instructions from the CPU 801. The display control unit 73 displays various screens on the display 808.

<Operation Procedure>

Figure 11:
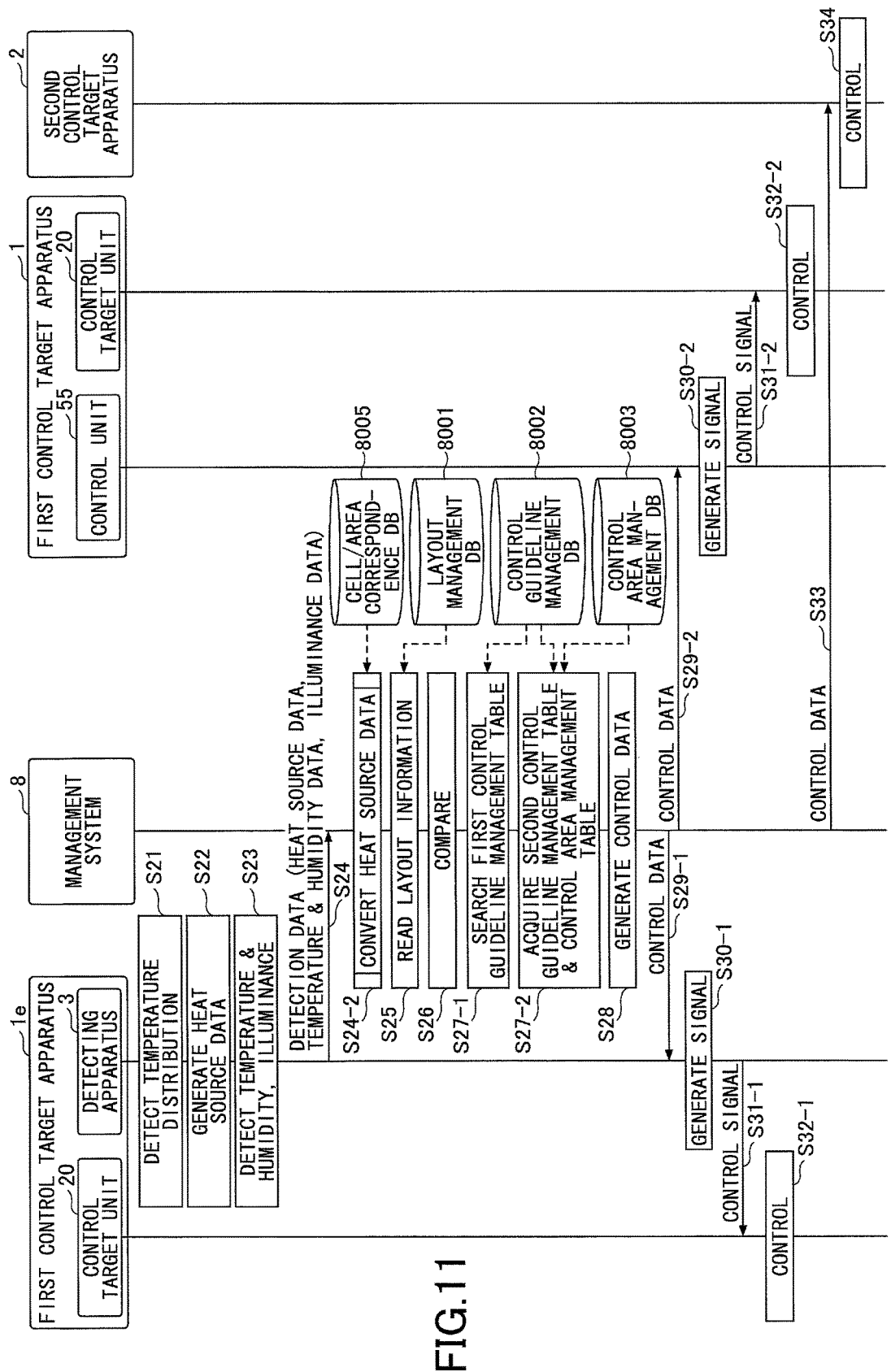
FIG. 11 is a sequence diagram illustrating an example of processing of the device control system according to the embodiment.

Processing or operations of the management system will be described below with reference to FIGS. 11 to 13. FIG. 11 is a sequence diagram illustrating an example of processing executed by the device control system 100 according to the embodiment. FIG. 12A is a conceptual diagram illustrating an example of a temperature distribution detected by the temperature distribution sensor 311. FIG. 12B is a conceptual diagram illustrating an example of heat source data that indicates the presence/absence of a heat source. FIG. 13 is a conceptual diagram illustrating heat source data that indicates the presence/absence of a heat source in all the areas 9 of the room α.

In the following descriptions of the processing, the management system 8 generates control data for controlling the first control target apparatus 1, the first control target apparatus 1e, and the second control target apparatus 2 based on various kinds of data detected by the first control target apparatus 1e. Then, the management system 8 transmits, to the first control target apparatus 1, the first control target apparatus 1e, and the second control target apparatuses 2, the generated control data to cause the first control target apparatus 1, the first control target apparatus 1e, and the second control target apparatuses 2 to control the light level and air conditioning. To simplify the descriptions, among the plurality of first control target apparatuses 1, processing relating to the first control target apparatus 1e, which includes the detecting apparatus 3, and another first control target apparatus 1, and the second control target apparatus 2 will be described.

First, in step S21, the detecting unit 32 of the first control target apparatus 1e detects a temperature distribution of the respective areas 9 in the room α.

Next, in step S22, the determining unit 33 determines, for each area 9, whether the temperature is within a predetermined range (e.g., 30° C. to 35° C.), and the generating unit 34 generates heat source data based on the determination result of the determining unit 33.

Here, generation of the heat source data will be described with reference to FIGS. 12A and 12B. FIG. 12A illustrates an example of the temperature distribution of the nine areas 9 detected by the detecting unit 32. In other words, FIG. 12A illustrates the detected result obtained by the detecting unit 32 detecting a temperature in each area 9. The generating unit 34 generates heat source data as illustrated in FIG. 12B based on the temperature distribution as illustrated in FIG. 12A. As can be expected from FIG. 12A and FIG. 12B, the heat source data of FIG. 12B is represented by heat source presence/absence information that indicates whether a heat source is present in each area 9. Specifically, an area 9 where the detected temperature is within a predetermined range (e.g., 30° C. to 35° C.) is represented by "1" indicating that a heat source is present, and an area 9 where the detected temperature is outside the predetermined temperature range (e.g., below 30° C. or above 35° C.) is represented by "0" indicting that a heat source is not present. Although the temperature distribution illustrated in FIG. 12A and the heat source data illustrated in FIG. 12B are obtained by detection cells in distorted shapes actually, they are expressed by squares for the convenience of the description.

Referring back to FIG. 11, in step S23, the detecting unit 32 of the first control target apparatus 1e detects illumination, temperature, and humidity near the first control target apparatus 1e.

Then, in step S24, the transmitting/receiving unit 31 of the first control target apparatus 1e transmits detection data to the management system 8. The detection data includes the heat source data generated in step S22, temperature/humidity data and illuminance data indicating the detection results obtained in step S23. The temperature/humidity data includes temperature data used for generating the heat source data. In this way, the transmitting/receiving unit 81 of the management system 8 receives the detection data. Note that the temperature data used for generating the heat source data is preferably data for each detection cell, but the temperature data used may be an average of the temperatures of some or all of the areas 9. In this way, the load on the management system 8 may be prevented from increasing. In this case, the temperatures of the averaged areas 9 may be handled as the same.

FIG. 13 illustrates heat source data obtained by synthesizing the heat source data transmitted from the plurality of first control target apparatuses 1 each including the detecting apparatus 3. FIG. 13 is a conceptual diagram illustrating the heat source data the presence/absence of heat sources in all the areas 9 within the room α. The heat source data illustrated in FIG. 12B corresponds to the upper left block B of the heat source data in FIG. 13. The heat source data of FIG. 13 is obtained by distorted detection cells actually.

In step S24-2, the cell conversion processing unit 85 of the management system 8 reads out the cell/area correspondence table from the cell/area correspondence DB 8005, and converts the heat source data into heat source data associated with the areas 9. Details of this will be described later below with reference to FIG. 16.

Next, in step S25, the storage/read processing unit 89 of the management system 8 reads out the layout information illustrated in FIG. 7A from the layout management DB 8001.

Then, in step S26, the comparing unit 82 compares the layout information illustrated in FIG. 7A with the heat source data illustrated in FIG. 13. By comparing the layout information and the heat source data, for example, it can be determined that a heat source is present in the area 9 where the first control target apparatus 1a is installed (with the area ID a11) in the layout information because the heat source filed of the corresponding area 9 is "1" in the heat source data.

Next, in step S27-1, the storage/write processing unit 89 of the management system 8 uses the values "1" and "0" indicating the presence/absence of a heat source in the heat source data as search keys to search for a corresponding light level (amount of light) from the first control guideline management table of the control guideline management database 8002 and reads the corresponding light level.

In step S27-2, the storage/read processing unit 89 of the management system 8 reads out the second control guideline management table from the control guideline management DB 8002 and reads out the control area management table from the control area management DB 8003.

Then, in step S28, the generating unit 84 generates control data indicating the light level (amount of light) for the first control target apparatus 1. Further, the generating unit 84 generates control data for the second control target apparatus 2. In this way, based on one set of detection data transmitted in step S24 (based on the same detection data), the generating unit 84 can generate both control data for the first control target apparatus 1 and control data for the second control target apparatus 2. Thus, in a case where both the first control target apparatus 1 and the second control target apparatus 2 are controlled, the number of times for which the detecting apparatus 3 performs detection and the number of times for which the management system 8 receives detection data may be reduced by half. Further, because the same detection data is used, consistency of the operations of the first control target apparatus 1 and the second control target apparatus 2 may be easily achieved.

Next, the transmitting/receiving unit 81 transmits the control data to the first control target apparatus 1e in step S29-1 and transmits the control data to the first control target apparatus 1 in step S29-2. Then, the transmitting/receiving unit 31 of the first control target apparatus 1e receives the control data. Further, the transmitting/receiving unit 51 of the first control target apparatus 1 other than the first control target apparatus 1e receives the control data.

Next, in step S30-1, the control unit 35 of the first control target apparatus 1e generates a control signal to be output to the control target unit 20 as the LED lamp 130 based on the received control data. Similarly, in step S30-2, the control unit 55 of the first control target apparatus 1 other than the first control target apparatus 1e generates a control signal to be output to the control target unit 20 as the LED lamp 130 based on the received control data.

In step S31-1, the control unit 35 outputs the generated control signal to the control target unit 20. In step S31-2, the control unit 55 outputs the generated control signal to the control target unit 20.

In this way, the light level of the control target unit 20 as the LED lamp 130 is controlled in the first control target apparatus 1e in step S32-1, and the light level of the control target unit 20 as the LED lamp 130 is controlled in the first control target apparatus 1 in step S32-2.

In step S33, the transmitting/receiving unit 81 of the management system 8 transmits the control data to the second control target apparatus 2. Then, the transmitting/receiving unit 51 of the second control target apparatus 2 receives the control data.

In this way, in step S34, the temperature, the humidity, the air volume, and the air flow direction of the control target unit 20 as the air conditioner are controlled.

For example, as illustrated in FIGS. 12A and 12B, it is determined that there is no heat source in the area 9 having the area ID a22 (because the area 9 is indicated by "0"). Thus, according to the first control guideline management table of FIG. 8A, the light level of the first control target apparatus 1 installed in the area 9 with the area ID a22 is controlled to be 0%. On the other hand, as illustrated in FIGS. 12A and 12B, it is determined that there is a heat source directly below the area 9 having the area ID a21 (because the area 9 is indicated by "1"). Thus, according to the first control guideline management table of FIG. 8A, the light level of the first control target apparatus 1 installed in the area 9 with the area ID a21 is controlled to be automatic mode.

In this way, when a heat source is detected due to the presence of a person, the light level of the LED may be set to a maximum value, and when a heat source is not detected due to the absence of a person, the light level of the LED can be lowered to thereby enhance energy saving performance. Further, because the light level is increased when a person is present, comfort can be improved.

<Determination of Presence/Absence of Heat Source>

Figure 15A:
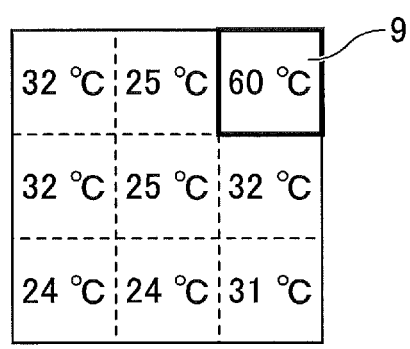
FIG. 15A is a conceptual diagram illustrating an example of a temperature distribution according to the embodiment.
Figure 15B:
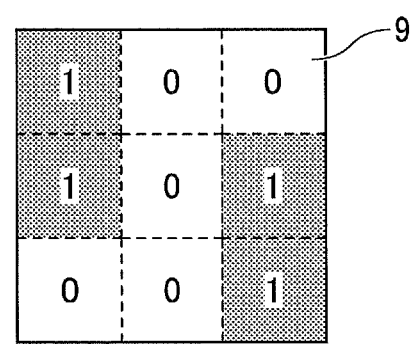
FIG. 15B is a conceptual diagram illustrating an example of heat source data according to the embodiment.

The method for determining the presence/absence of a heat source in step S22 of FIG. 11 will be described. FIG. 14 is a flowchart illustrating an example of a method of generating the heat source data. FIG. 15A is a conceptual diagram illustrating an example of a temperature distribution, and FIG. 15B is a conceptual diagram illustrating an example of heat source data indicating the presence/absence of a heat source.

First, in step S101, the generating unit 34 of the management system 8 extracts, from the temperature distribution data, an area 9 for which the determining unit 33 has not yet determined whether a temperature is within a predetermined range (e.g., 30° C. to 35° C.).

Then, in step S102, the determining unit 33 determines whether the temperature of the area 9 extracted in step S101 is within the predetermined range. For example, as FIG. 15A, when an electric pot (water heater) is installed in the area 9 where the first control target apparatus 1 with the apparatus ID a13 is installed, steam or heat emitted by the electric pot may cause the temperature of this area 9 to rise to 60° C. In such a case, because the temperature is not within the range of the heat source corresponding to a human being (e.g., 30° C. to 35° C.) even if a heat source is present, the determining unit 33 preferably does not detect (determine) that a person is present.

When determining that the temperature of the extracted area 9 is within the predetermined range (YES in step S102), the determining unit 33 determines that a heat source is present in step S103. In this case, as illustrated in FIG. 15B, "1" indicating that a heat source is present is set for the extracted area 9 of the heat source data.

On the other hand, when determining that the temperature of the extracted area 9 is not within the predetermined range (NO in step S102), the determining unit 33 determines that there is no heat source in step S104. In this case, as illustrated in FIG. 15B, "0" indicating that there is no heat source is set for the extracted area 9 of the heat source data.

After the process of step S103 or step S104, the determining unit 33 determines in step S105 whether the determination of whether a temperature of an area 9 is within the predetermined range has been completed with respect to all the areas 9. When it is determined that the determination has been completed with respect to all the areas 9 (YES in step S105), the process of step S22 of FIG. 11 is ended. On the other hand, when it is determined that the determination has not yet been completed with respect to all the areas 9 (NO in step S105), the processing returns to step S101 as illustrated in FIG. 14.

In this way, according to the processing as illustrated in FIG. 14, even when a heat source is present, if the temperature of the heat source is outside the temperature range of a specific object (e.g., human being) to be detected as a heat source, it is determined that no heat source is present. In this way, it is possible to detect the presence of a human being more accurately. As a result, it is possible to enhance energy saving performance more accurately.

<Correspondence Between Heat Source Data and Area>

The heat source data as illustrated in FIG. 13 is obtained in the manner described above. However, because the shape of each cell of the heat source data may actually be distorted depending on the mounting angle of the temperature distribution sensor 311, the following inconvenience may occur.

Note that the temperature of each area 9 can be detected with higher accuracy as the number of the temperature distribution sensors 311 is increased. However, increasing the number of the temperature distribution sensors 311 leads to a cost increase. Thus, it is considered that a plurality of temperature distribution sensors 311 are installed in one first control target apparatus 1. However, in this case, the temperature distribution sensors 311 have to be inclined relative to the floor surface rather than being installed perpendicular to the floor surface. Because the plurality of temperature distribution sensors 311 have to be installed within a limited location that is integrated with or is in the vicinity of the first control target apparatus 1, a temperature detectable range 501 of one temperature distribution sensor 311 cannot be enlarged unless the temperature distribution sensor 311 is installed with inclination.

Figure 16A:
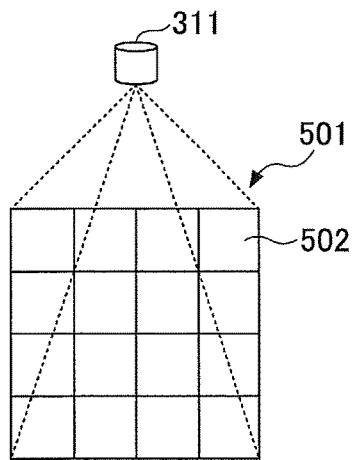
FIGS. 16A to 16C are diagrams describing examples of relationships between the number of temperature distribution sensors and their detectable ranges according to the embodiment.
Figure 16B:
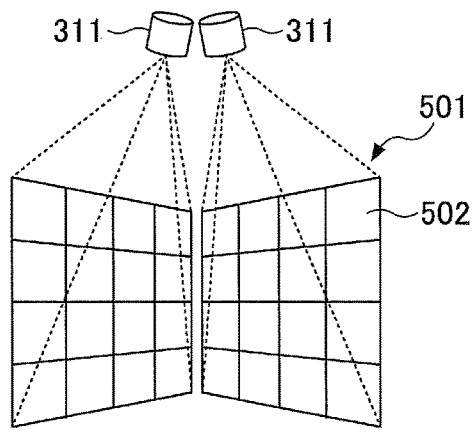
Figure 16C:
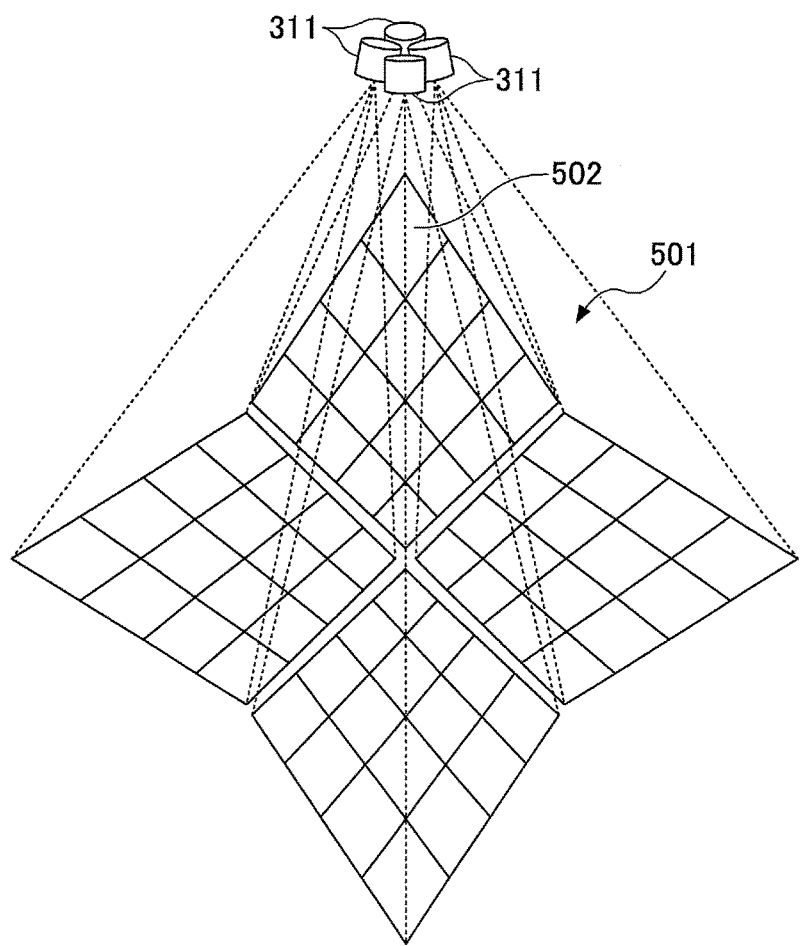

FIGS. 16A to 16C are diagrams describing examples of relationships between the number of temperature distribution sensors 311 and their detectable ranges 501. In FIG. 16A, one temperature distribution sensor 311 is installed perpendicular to the floor surface, and the shape of the detectable range 501 of the temperature distribution sensor 311 is a square (or a rectangle). In FIG. 16B, two temperature distribution sensors 311 are installed with at inclined angles with respect to the floor surface, and the shapes of the detectable ranges 501 of the respective two temperature distribution sensors 311 are distorted into trapezoidal shapes due to trapezoidal distortion. In FIG. 16C, four temperature distribution sensors 311 are installed at inclined angles with respect to the floor surface, and the shapes of the detectable ranges 501 of the respective four temperature distribution sensors 311 are distorted into distorted shapes (substantially diamond shapes) with one diagonal line of a square being extended. This is because the temperature distribution sensors 311 are installed in a rotated state by 90 degrees with respect to FIG. 16B.

On the other hand, the room α is divided into a plurality of areas 9 that are squares or rectangles. Thus, when a plurality of temperature distribution sensors 311 are installed in one first control target apparatus 1, it is required to associate heat source data in distorted shapes with the areas 9 within the room α.

Figure 17A:
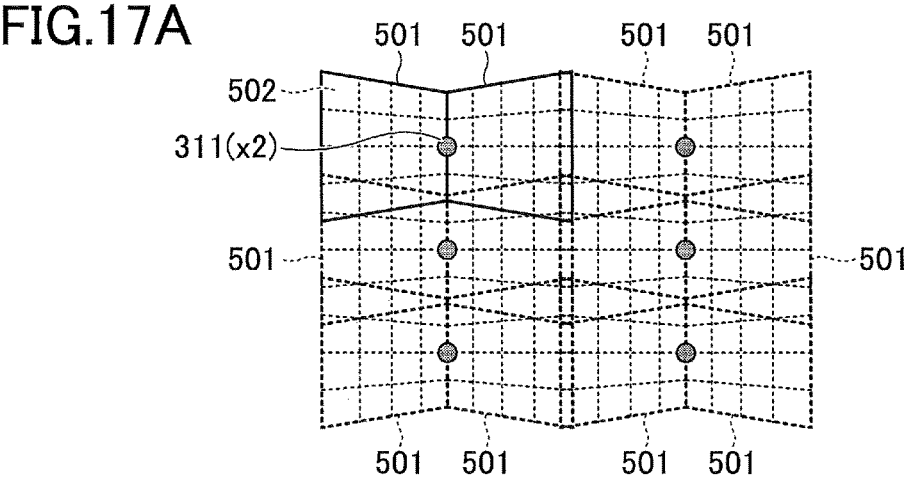
FIGS. 17A to 17C are diagrams illustrating an example of detection areas that two temperature distribution sensors detect according to the embodiment.

FIG. 17A illustrates the detectable ranges 501 that two temperature distribution sensors 311 of each first control target apparatus 1 detect. FIG. 17A illustrates a total of six first control target apparatuses 1. Each of the six first control target apparatuses 1 has two temperature distribution sensors 311. Further, each temperature distribution sensor 311 includes 4×4 thermopile sensors. That is, one temperature distribution sensor 311 can detect temperatures of 16 locations in parallel. The detectable range 501 of one thermopile sensor, which is an example of a sensor detection range, is referred to as a detection cell 502.

Figure 17B:
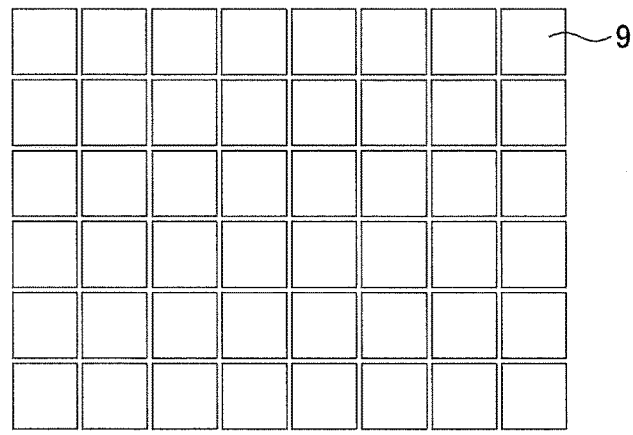

Because the temperature distribution sensors 311 are not installed perpendicular to the floor surface, the detectable ranges 501 and detection cells 502 are distorted into trapezoidal shapes. Thus, the heat source data, transmitted from the detecting apparatus 3 to the management system 8, is also obtained in such distorted shapes. It is difficult to use the heat source data distorted into trapezoidal shapes for the temperature of each area 9 of the room α. Accordingly, the heat source data is converted into a shape without distortions as illustrated in FIG. 17B. Alternatively, the presence/absence of a heat source in each detection cell 502 of the heat source data may be associated with a corresponding area 9 of the room α. That is, the plurality of squares illustrated in FIG. 17B respectively represent the plurality of areas 9 in the room α.

Figure 17C:
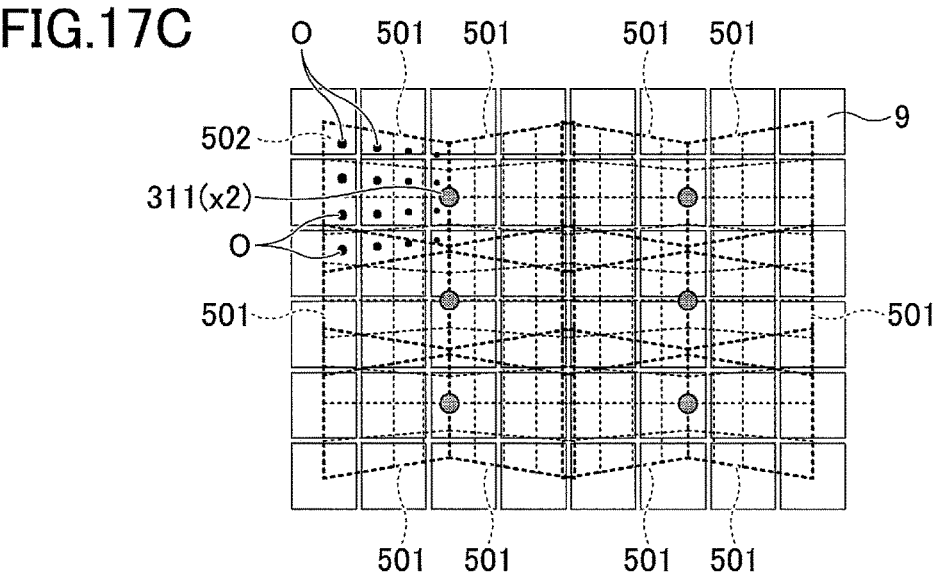

FIG. 17C is a diagram in which FIG. 17A is superimposed on FIG. 17B. The cell conversion processing unit 85 of the management system 8 associates each area 9 of FIG. 17B with a corresponding detection cell 502 of FIG. 17A, and sets, for each area 9, heat source data (presence/absence of a heat source) of the detection cell 502 detected by the thermopile sensor overlapping with the area 9. One area 9 may is not necessarily be limited to including only one detection cell 502. In a case where one area 9 is associated with a plurality of detection cells 502, the logical sum of the heat source data indicating the presence/absence of a heat source is set for the area 9.

Figure 18:
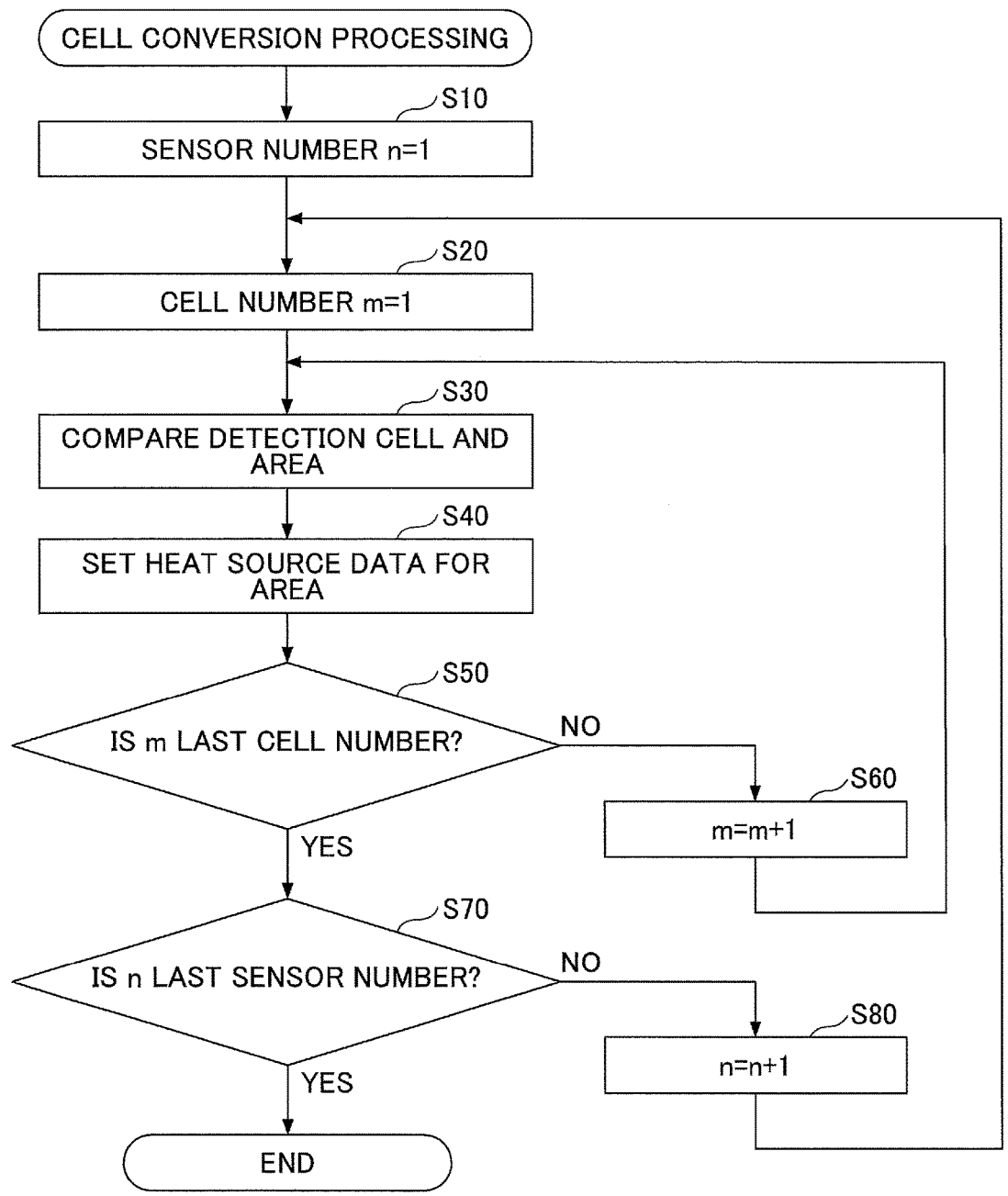
FIG. 18 is a flowchart illustrating an example of processing that a cell conversion processing unit of the management system performs for associating detection cells of detectable ranges with areas according to the embodiment.

FIG. 18 is a flowchart illustrating an example of processing that the cell conversion processing unit 85 of the management system 8 performs for associating the detection cells 502 of the detectable ranges 501 with the areas 9. The processing of FIG. 18 is executed in the process of step S24-2 of FIG. 11.

First, in step S10, the cell conversion processing unit 85 sets the value "1" to "n", which represents a sensor number of a temperature distribution sensor 311. The sensor number "n" is a serial number assigned to each of the temperature distribution sensors 311 and is used to specify a temperature distribution sensor 311 of interest.

Next, in step S20, the cell conversion processing unit 85 sets the value "1" to "m", which represents a cell number of a detection cell 502. The cell number m is a serial number assigned to each of the detection cells 502 formed by the plurality of respective thermopile sensors included in one temperature distribution sensor 311.

In step S30, the cell conversion processing unit 85 determines which area 9 overlaps with the detection cell 502 of the thermopile sensor of interest. In other words, the cell conversion processing unit 85 determines a corresponding area 9 overlapping with the detection cell 502 of the thermopile sensor of interest. This determination is made based on whether center coordinates O of the detection cell 502 of the thermopile sensor is included within an area 9. The center coordinates O will be described later below with reference to FIG. 19.

In step S40, the cell conversion processing unit 85 sets the heat source data (indicating the presence/absence of a heat source) of the detection cell 502 of interest in the area 9 that has been associated with the detection cell 502 of interest in step S30.

In step S50, the cell conversion processing unit 85 determines whether the current value of "m" is the last cell number. When determining that the current value of "m" is not the last cell number (NO in step S50), the cell conversion processing unit 85 increments the value of "m" by 1 in step S60. Then, the cell conversion processing unit 85 repeats the processes of the steps S30 to S50.

When determining that the current value of "m" is the last cell number (YES in step S50), the cell conversion processing unit 85 determines whether the current value of "n" is the last sensor number in step S70. When determining that the current value of "n" is not the last sensor number (NO in step S70), the cell conversion processing unit 85 increments the value of "n" by 1 in step S80. Then, the cell conversion processing unit 85 repeats the processes of the steps S20 to S70. When determining that the current value of "n" is the last sensor number (YES in step S70), the processing of FIG. 18 is ended.

The processing of FIG. 18 for associating the areas 9 with the detection cells 502 may be performed by the management system 8 or the detecting apparatus 3. Then, when the cell number "m" is converted into the unique cell ID, a table, which associates the area ID of the area 9 with the cell ID, may be created. It should be noted that the management system 8 or the detecting apparatus 3 may create the table, in which respective cell IDs are associated with the area IDs. Thus, after the first control target apparatus 1e is installed on the ceiling β, the cell conversion processing unit 85 can refer to such a table to convert heat source data in distorted shapes into heat source data of the areas 9.

Figure 19:
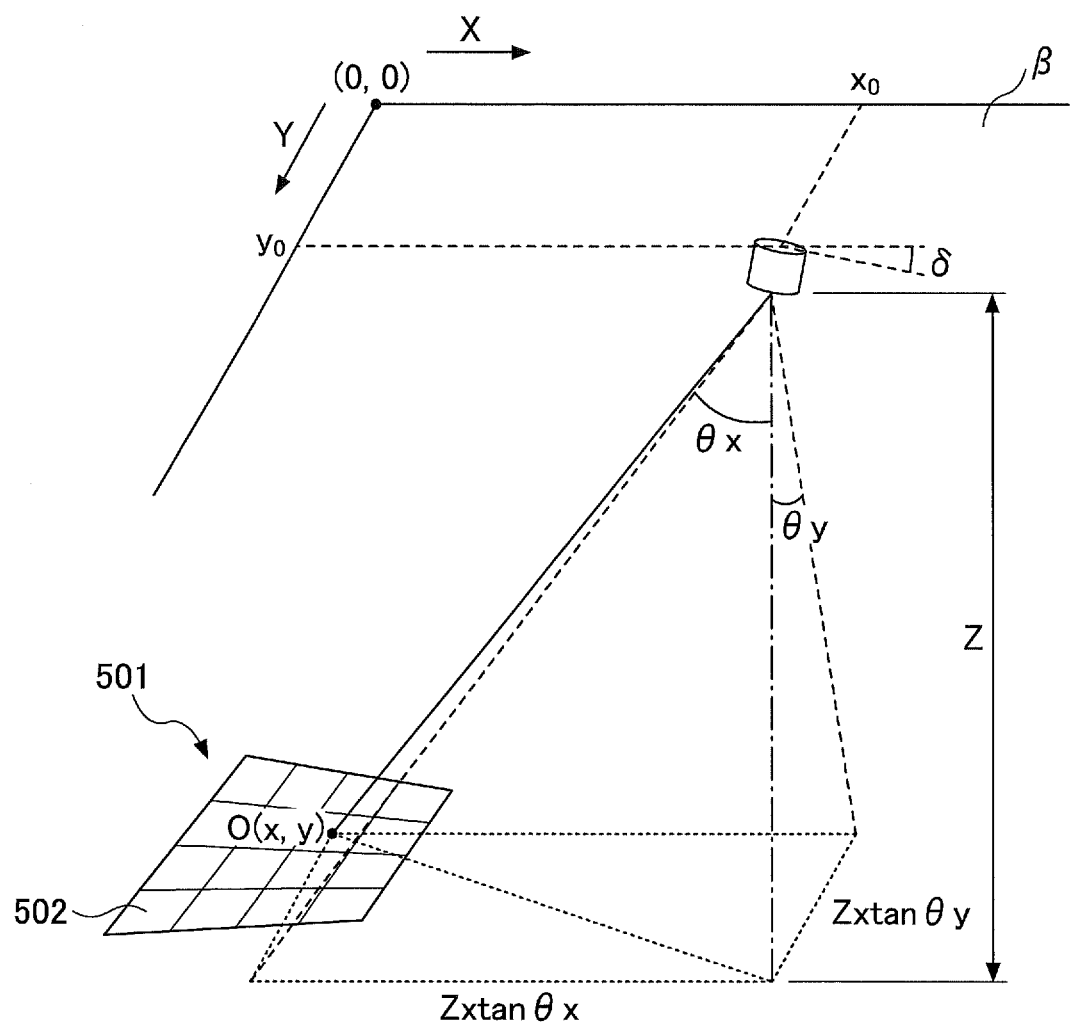
FIG. 19 is a diagram describing an example of center coordinates O of a detection cell that a thermopile sensor detects according to the embodiment.

FIG. 19 is a diagram describing an example of the center coordinates O of a detection cell 502 that a thermopile sensor detects. In FIG. 19, coordinates $(x_0, y_0)$ in the ceiling β are assigned to a position of a thermopile sensor with respect to a corner of the ceiling β as the origin (0, 0), for example. Also, height Z is assigned as the height of the ceiling β. Then, it is assumed that each thermopile sensor is installed at inclination angles (depression angles) $\theta x$ and $\theta y$ with respect to the floor surface. Here, $\theta x$ represents an inclination angle in the X direction, and $\theta y$ represents an inclination angle in the Y direction.

Based on the above, the center coordinates O of the detection cell 502 that one thermopile sensor detects may be obtained by $(x_0 - Z \tan \theta x, y_0 - Z \tan \theta y)$. The inclination angles $\theta x$ and $\theta y$ may be determined based on an installation angle δ of the detecting apparatus 3 with respect to the first control target apparatus 1 and a central angle of a detection direction range of the thermopile sensor (central angle when the thermopile sensor is installed perpendicular to an installation surface) that is provided by the manufacturer of the thermopile sensor, for example. That is, because the central angle of the detection direction range of each thermopile sensor may be provided by the manufacturer of the thermopile sensor, the inclination angles $\theta x$ and $\theta y$ may be obtained by adding, to the central angle, the installation angle δ of the detecting apparatus 3 with respect to the first control target apparatus 1. Note that FIG. 19 illustrates a state in which the illustrated inclination angles $\theta x$ and $\theta y$ include the installation angle δ. The position $(x_0, y_0)$ of the thermopile sensor, the inclination angles $\theta x$ and $\theta y$, and the installation angle δ are information relating to the position of the detection cell 502 formed by the thermopile sensor.

Because the coordinates of each of the areas 9 are values obtained by equally dividing the size of the room α in vertical and horizontal directions, the coordinates of the areas 9 may be easily obtained based on the size of the room α, which may be acquired through actual measurement or from a blue print (layout drawing) of the room α, for example. Thus, the cell conversion processing unit 85 can determine which area 9 includes the center coordinates O of each thermopile. In other words, the corresponding area 9 that includes the center coordinates O of the detection cell 502 of each thermopile may be determined based on the coordinates of the areas 9.

Note that instead of comparing the center coordinates O of the detection cell 502 with the coordinates of the area 9 to determine whether the center coordinates O are included in the area 9, it may be determined as to whether at least one corner of the detection cell 502 is included in the area 9, for example. In a case where a determination is made as to whether all four corners of a detection cell 502 are included in a given area 9, the number of areas 9 that are determined to include a heat source tends to increase. Thus, implementation of such a determination may be suitable in a case where illumination and air conditioning are desirably controlled to estimate a possibility of the presence of a person to be high.

Also, in some embodiments, when calculating the center coordinates O of a detection cell 502, a height, at which a person is present, may be used instead of the height of the ceiling β. For example, the height, at which a person is present, may be about "Z−110 cm". In this way, it becomes easy to associate a detection cell 502 with an area 9 where a person is actually located.

As described above, although the heat source data obtained by the detecting apparatus 3 is in a distorted shape, the heat source data can be converted into heat source data of each area 9 within the room α by implementing the processing illustrated in FIG. 18.

Note that in the above-described processing of FIG. 18, logical sum processing is applied in which it is determined that a heat source is present when at least one center coordinates of a detection cell 502 is included in a certain area 9. On the other hand, even if the center coordinates of two or more detection cells 502 are included in a certain area 9, only one heat source is determined to be present in the area 9. In this way, an erroneous determination that a person is not present despite the presence of a person in the area 9 can be reduced. For example, the above processing may be useful when the area 9 is large.

Also, the center coordinates O of a detection cell 502 does not necessarily have to be the geometric center but may also be the center of gravity of the detection cell 502, for example. Further, the center coordinates O is not limited to the geometric center or the center of gravity but may be any point within the detection cell 502. This is because a heat source can be detected when the heat source is located at any point within the detection cell 502.

Also, the processing of FIG. 18 may be performed by the detecting apparatus 3, rather than the management system 8. Alternatively, the processing of FIG. 18 may be performed by the first control target apparatus 1.

<Illumination Control Using Heat Source Data>

Illumination control using heat source data will be described. Because the administrator or the like can divide the area 9 into a desired number, it is rare that the area 9 and the first control target apparatus 1 are in one-to-one correspondence.

Figure 20:
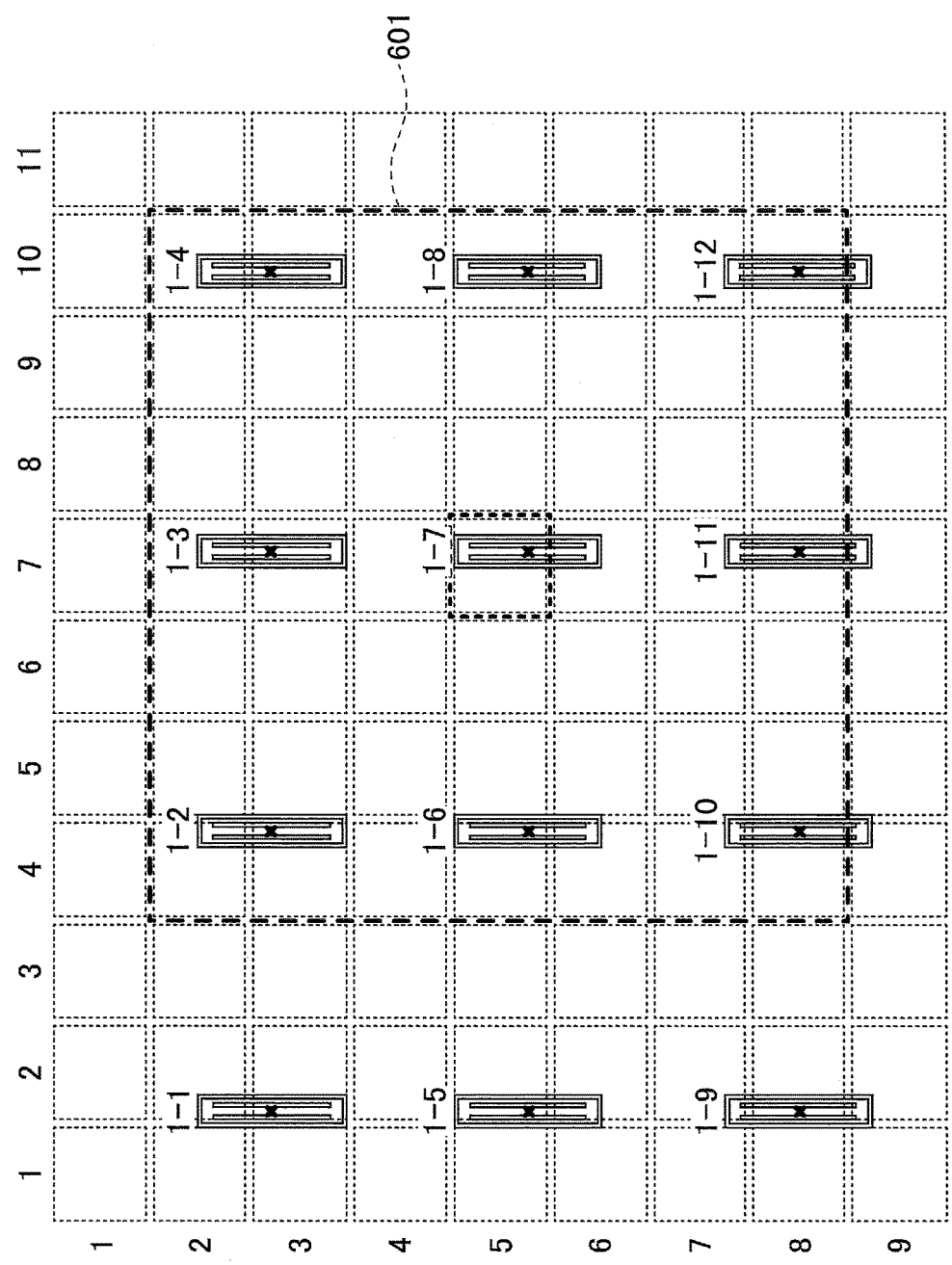
FIG. 20 is a diagram illustrating an example of arrangement of the first control target apparatuses, areas, and a human detection range of the first control target apparatus according to the embodiment.

FIG. 20 is a diagram illustrating an example of arrangement of the first control target apparatuses 1, the areas 9, and a human detection range of the first control target apparatus 1. It should be noted that the installation relationship between the areas 9 and the first control target apparatuses 1 of FIG. 20 is different from the installation relationship of FIG. 7A. In FIG. 20, the room is divided in to 99 areas 9 (9×11 areas). The number of first control target apparatuses 1 is 12. In FIG. 20, the apparatus IDs of the first control target apparatuses 1 are expressed by 1-1 to 1-12, and the area IDs are expressed by combinations of a column number and a line number.

The administrator of the device control system 100 may previously register a distance between a heat source and the first control target apparatuses 1 for illuminating the first control target apparatuses 1. When a heat source is located within the registered distance from the first control target apparatus 1, the device control system 100 may illuminate the first control target apparatus 1. Further, the administrator may previously register a way of illuminating the first control target apparatuses 1. Areas 9, in which the first control target apparatuses 1 are illuminated when a heat source is present, is referred to as human detection ranges 601. For example, the first control target apparatus 1-7 will be described.

The human detection range 601 of the first control target apparatus 1-7 is the area 9 designated by the line numbers 2 to 8 and the column numbers 4 to 10. Accordingly, when a heat source is detected in this area 9, the first control target apparatus 1-7 is illuminated.

The control guideline as described above is registered in the first control guideline management table of the control guideline management DB 8002. FIG. 21A is a table illustrating an example of the first control guideline management table. In the first control guideline management table of FIG. 21A, the areas 9, which are illuminated when a heat source is present, are associated with the apparatus IDs of the first control target apparatuses 1. In other words, each of the apparatus IDs may be associated with one or more corresponding area IDs to be illuminated. Accordingly, it is possible to arbitrarily set the human detection ranges 601 for the respective first control target apparatuses 1.

Figure 22:
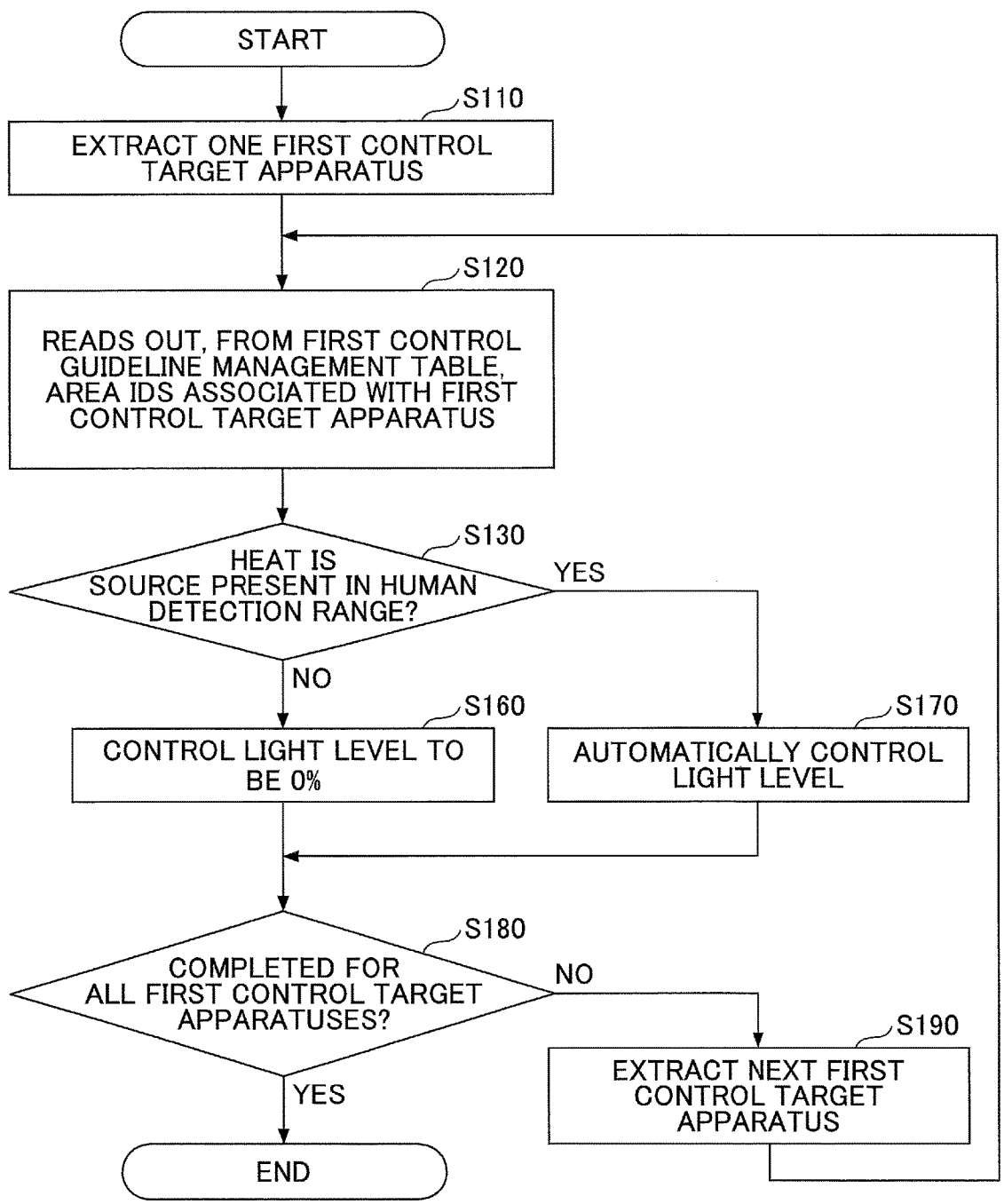
FIG. 22 is a flowchart illustrating an example of a procedure that a generating unit of the management system executes for generating control data for the first control target apparatuses according to the embodiment.

FIG. 22 is a flowchart illustrating an example of a procedure that the generating unit 84 of the management system 8 executes for generating control data for the first control target apparatuses 1. The processing of FIG. 22 is performed in the process of step S28 of FIG. 11.

First, in step S110, the generating unit 84 extracts one first control target apparatus 1 that is to be controlled in the room.

Next, in step S120, the generating unit 84 reads outs, from the first control guideline management table, area IDs (human detection range) associated with the first control target apparatus 1. Note that because coordinates of the temperature distribution sensors 311 are known, the areas 9 to which the coordinates of the temperature distribution sensors 311 belong may be searched for from the area information DB 8004. When relative positions of two human detection ranges 601 are fixed to the first control target apparatus 1 and the areas 9 to which the coordinates of the temperature distribution sensors 311 belong can be specified, the two human detection ranges 601 can be specified.

In step S130, the generating unit 84 determines whether a heat source is present (a person is present) in the human detection range 601.

When determining that the heat source (human) is present (YES in step S130), the generating unit 84 determines to automatically control the light level of the first control target apparatus 1 in step S170.

When determining that the heat source (human) is not present (NO in step S130), the generating unit 84 determines to control the light level of the first control target apparatus 1 to be 0% in step S160.

In step S180, the generating unit 84 determines whether control data has been generated for all the first control target apparatuses 1 to be controlled.

When determining that control data has not been generated for all the first control target apparatuses 1 (NO in step S180), the generating unit 84 extracts a next first control target apparatus 1 in step S190. When determining that control data has been generated for all the first control target apparatuses 1 (YES in step S180), the processing of FIG. 22 is ended.

Further, as illustrated in FIG. 21B, two human detection ranges 601 may be registered in the first control guideline management table. In FIG. 21B, areas 9 (human detection range 601), where the light level is automatically controlled when a heat source is present, and areas 9 (human detection range 601), where the light level is controlled to be 30% when a heat source is present, are associated with each of the apparatus IDs of the first control target apparatuses 1. That is, different human detection ranges 601 are prepared. According to the first control guideline management table as described above, it is possible to control the light level in accordance with a distance from the first control target apparatus 1-7 to a heat source, for example. For example, it is effective for a control guideline used for brightening up the area 9 at night even if a person is absent. In order to further enhance energy saving performance, 30% may be changed to 10%, and % may be set to be automatic (lower than the targeted illuminance P of the human detection range 601 at the closer side). It becomes possible to perform the control that satisfies both energy saving performance and comfort in accordance with the presence/absence of a heat source.

The administrator can arbitrarily set the shapes of the areas 9 of automatic and 30%. Further, three or more light levels may be set for associating the areas 9 with the first control target apparatuses 1.

Figure 23:
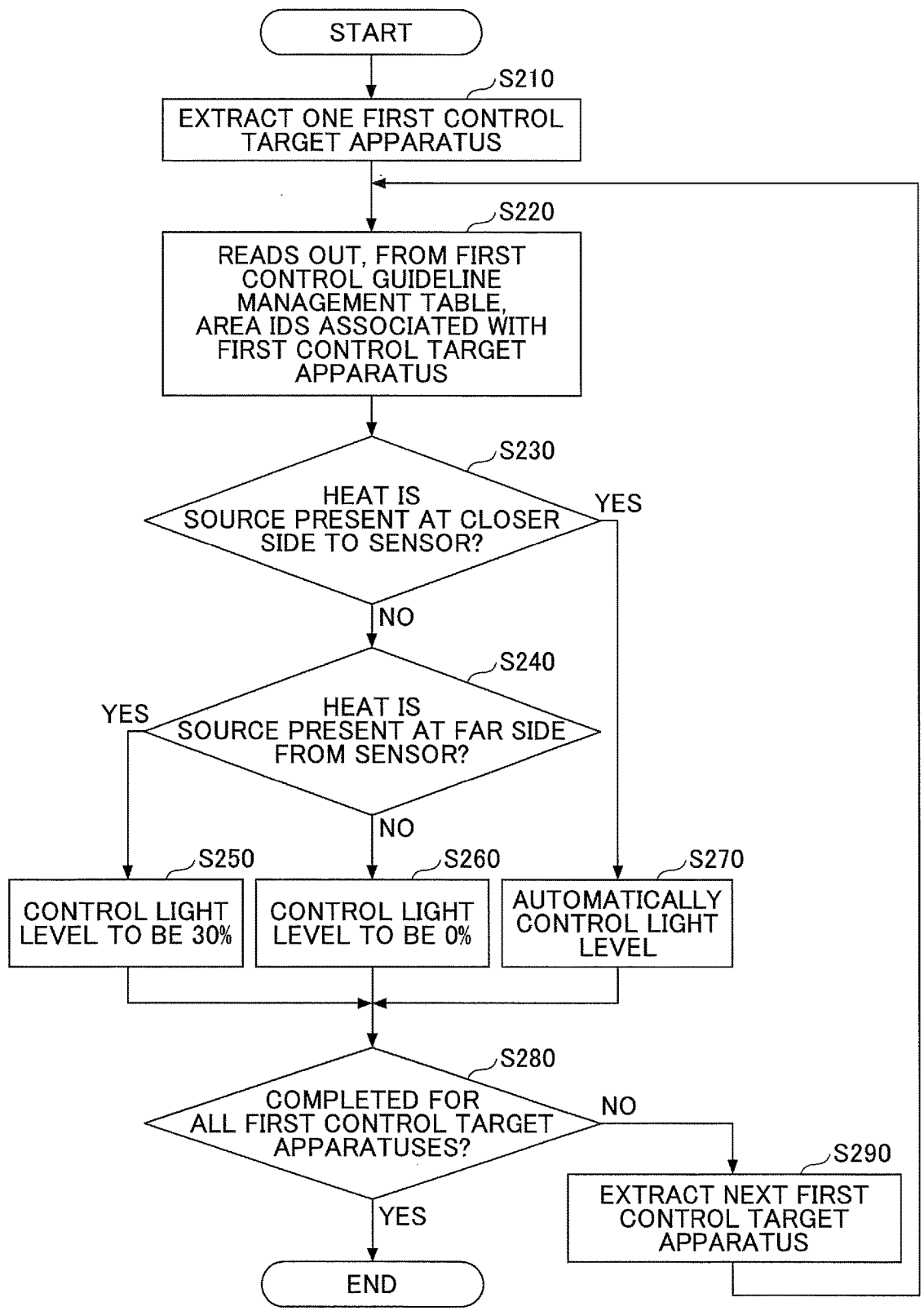
FIG. 23 is a flowchart illustrating an example of a procedure that the generating unit of the management system executes for generating control data for the first control target apparatuses in a case of using the first control guideline management table of FIG. 21B according to the embodiment.

FIG. 23 is a flowchart illustrating an example of a procedure that the generating unit 84 of the management system 8 executes for generating control data for the first control target apparatuses 1 in a case of using the first control guideline management table of FIG. 21B. The processing of FIG. 23 is performed in the process of step S28 of FIG. 11.

First, in step S210, the generating unit 84 extracts one first control target apparatus 1 that is to be controlled in the room.

Next, in step S220, the generating unit 84 reads outs, from the first control guideline management table, area IDs associated with the first control target apparatus 1.

In step S230, the generating unit 84 determines whether a heat source is present (a person is present) in a human detection range 601 at a closer side to the temperature distribution sensor 311.

When determining that the heat source (person) is present in the human detection range 601 at the closer side (YES in step S230), the generating unit 84 determines to automatically control the light level of the first control target apparatus 1 in step S270.

When determining that the heat source (person) is not present in the human detection range 601 at the closer side (NO in step S230), the generating unit 84 determines in step S240 whether a heat source is present (a person is present) in a human detection range 601 at a far side from the temperature distribution sensor 311.

When determining that the heat source (person) is present in the human detection range 601 at the far side (YES in step S240), the generating unit 84 generates control data for making the light level of the first control target apparatus 1 to be 30% in step S250.

When determining that the heat source (person) is not present in the human detection range 601 at the far side (NO in step S240), the generating unit 84 generates control data for making the light level of the first control target apparatus 1 to be 0% in step S260.

In step S280, the generating unit 84 determines whether control data has been generated for all the first control target apparatuses 1 to be controlled.

When determining that control data has not been generated for all the first control target apparatuses 1 (NO in step S280), the processing goes to step S290 and the generating unit 84 extracts a next first control target apparatus 1 in step S290. When determining that control data has been generated for all the first control target apparatuses 1 (YES in step S280), the processing of FIG. 23 is ended.

Thus, every time heat source data is obtained, the management system 8 generates control data for each of the first control target apparatuses 1 and the second control target apparatuses 2. Therefore, it becomes possible to perform the control that satisfies both energy saving performance and comfort while maintaining the optimum control all the time.

Note that the administrator can set the first control guideline management table from the administrator PC 7. If the areas 9 are fixed, it is possible to designate the apparatus IDs of the first control target apparatuses 1 and the area IDs of the areas 9 to create the first control guideline management table. Further, the administrator can set a manner of dividing the entire area 9. For example, when the administrator inputs and transmits the number of lines dividing the room α and the number of columns dividing the room α to the management system 8, the management system 8 may divide the room α with the transmitted numbers to generate the areas 9. Further, human detection ranges 601 that vary depending on time of day may be set.

<Control of Illuminance in Case where Light Level is Set to be Automatic>

Figure 24:
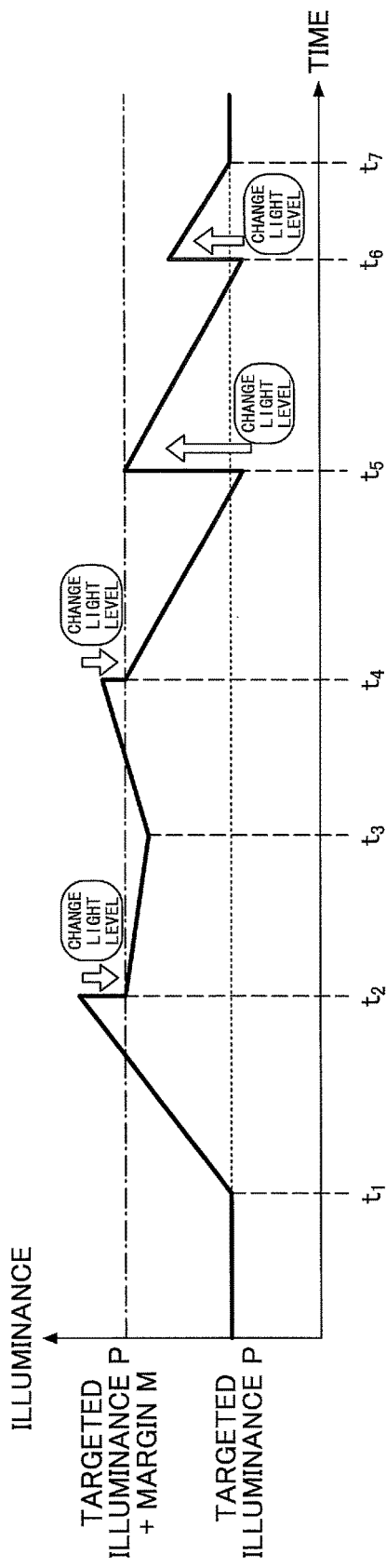
FIG. 24 is a graph illustrating an example of a manner in which the illuminance is controlled with respect to a targeted illuminance P and the targeted illuminance P+a margin M.

In the following, control of illuminance in a case where the light level is set to be automatic will be described. The control of the illuminance will be schematically described with reference to FIG. 24. FIG. 24 is a diagram illustrating an example of a manner in which an illuminance is controlled with respect to the targeted illuminance P and the targeted illuminance P+the margin M. In FIG. 24, a lateral axis indicates time, and a vertical axis indicates illuminance. The time of the lateral axis illustrates a period of time that approximately covers from sunrise to sunset. Because external light enters the room α, the illuminance is changed by the external light. The external light may be natural light, for example. It is possible to improve energy saving performance because the external light can be used to reduce the light level of the first control target apparatus 1.

The targeted illuminance P is an illuminance at which a person can work comfortably even when the external light is not present at all. Accordingly, the targeted illuminance P does not have to be constant and may vary depending on a person and details of work. For example, the targeted illuminance P is experimentally decided to be an illuminance at which a person feels comfortable even when an illuminance obtained by external light is zero at night. For example, external light does not enter the room at night. The descriptions will be given based on a lapse of time. It should be noted that in the following example described, the device control system 8 may control, based on an illuminance in a predetermined space detected by the detecting apparatus, a light level of the first control target apparatus 1 so as to change the illuminance in the predetermined space.

At time t1, the first control target apparatus 1 is already in an illuminating state. At time t1, the illuminance starts to increase because the sun rises and the external light starts to enter into the room.

At time t2, the generating unit 84 controls the light level of the first control target apparatus because a length of time, during which the illuminance exceeds the targeted illuminance P+the margin M, exceeds threshold "t" seconds. In this case, the generating unit 84 decreases the light level to the targeted illuminance P+the margin M. Note that even if it is required to set the light level to zero (lights out) in order to decrease the illuminance to the targeted illuminance P+the margin M, such a control is not performed. This is because, when the light level is zero, the illuminance is subject to effects of external light or a person may feel uncomfortable at the time of lighting again. Further, even when the light level is set not to be zero in order to reduce the effects of the external light, the light level is controlled so as not to fall below the lower limit light level. The lower limit light level is a predetermined light level to be maintained regardless of the illuminance. The light level of the first control target apparatus 1 is controlled so as not to be less than the lower limit light level. It is possible for a user to set the lower limit light level to be 0%, and in this case, the light level can be 0%. According to the embodiment, the lower limit light level is set to be a value greater than 0%.

At time t3, the illuminance falls below the targeted illuminance P+the margin M because the sun is hidden by a thin cloud, but the illuminance does not fall below the targeted illuminance P. When the illuminance is in a range of from "the targeted illuminance P to the targeted illuminance P+the margin M", the generating unit 84 does not control the light level of the first control target apparatus 1. Accordingly, even when the illuminance is changed by the external light from time t2 to time t4, the generating unit 84 does not control the light level.

At time t4, the generating unit 84 controls the light level of the first control target apparatus 1 because a length of time, during which the illuminance exceeds "the targeted illuminance P+the margin M", exceeds the threshold t seconds. In this case, the generating unit 84 decreases the light level to "the targeted illuminance P+the margin M".

From time t4 to time t5, the sun starts to go down gradually and the illuminance decreases slowly. When the illuminance falls below the targeted illuminance P, the generating unit 84 controls the light level of the first control target apparatus 1 so that the illuminance becomes the targeted illuminance P+the margin M promptly.

From time t5 to time t6, the illuminance slowly decreases. When the illuminance falls below the targeted illuminance P, the generating unit 84 controls the light level of the first control target apparatus 1 so that the illuminance becomes the targeted illuminance P+the margin M promptly. However, the generating unit 84 does not set the light level to be a light level higher than the maximum light level. The maximum light level is a light level at which the first control target apparatus 1 can provide a sufficient illuminance. For example, if the light level of 100% is the maximum light level of the performance of the first control target apparatus 1, the light level, at which the targeted illuminance P is obtained in a state in which external light is not present, is the maximum light level. In other words, when the light level of the first control target apparatus 1 is set to be the maximum light level in a state in which external light is not present, the illuminance in the predetermined space is the targeted illuminance P. That is, the maximum light level is a light level at which an illuminance is obtained for a person to work comfortably even when the external light is not present at all. Before time t1, the light level is controlled to be the maximum light level. When the external light is not present at all, the illuminance obtained by the maximum light level is substantially equal to the targeted illuminance. At time t6, the light level is increased to the maximum light level. However, the illuminance does not reach the targeted illuminance P+the margin M because the external light is weak.

From time t6 to time t7, the illuminance slowly decreases, and the external light becomes absent at time t7. However, because the first control target apparatus 1 is already controlled at the maximum light level that satisfies the targeted illuminance P, the illuminance does not fall below the targeted illuminance P.

Therefore, according to the control as illustrated in FIG. 24, because the illuminance is controlled to be the targeted illuminance P+the margin M when the illuminance falls below the targeted illuminance P, it is possible to reduce the number of times for which the illuminance falls below the targeted illuminance P. Thus, it is possible to reduce the number of times for which a state, in which the illuminance is lower than the targeted illuminance P, continues for a fixed time, and to prevent comfort from being decreased. Because the number of times for which the illuminance falls below the targeted illuminance P can be reduced, the number of times for which the illuminance is controlled is reduced and occurrence of flickering can be reduced.

Even when the illuminance exceeds the targeted illuminance P+the margin M, the light level of the first control target apparatus 1 is not controlled during the threshold t seconds. Therefore, the number of times for which the illuminance is controlled can be reduced and occurrence of a flicker can be reduced.

In other words, based on the illuminance in the predetermined space detected by the detecting apparatus 3, the management system 8 may change the light level of the first control target apparatus 1 to change the illuminance in the predetermined space because the illuminance in the predetermined space is varied depending on external light that enters into the predetermined space. For example, when the illuminance in the predetermined space detected by the detecting apparatus 3 falls below the targeted illuminance P, the management system 8 may increase the light level of the first control target apparatus 1 so that the illuminance in the predetermined space becomes the targeted illuminance P+the margin M. At this time, the management system 8 may control the light level of the first control target apparatus 1 in a range not exceeding a predetermined maximum light level. On the other hand, when the illuminance in the predetermined space exceeds the targeted illuminance P+the margin M for a time longer than a threshold time, the management system 8 may decrease the light level of the first control target apparatus 1 so that the illuminance in the predetermined space becomes the targeted illuminance P+the margin M. At this time, the management system 8 may control the light level of the first control target apparatus 1 in a range not falling below a predetermined lower limit light level. On the other hand, when the illuminance in the predetermined space is in a range from the targeted illuminance P to the targeted illuminance P+the margin M, the management system 8 does not control the light level of the first control target apparatus 1.

<<Comparison with Conventional Control Method>>

Figure 25:
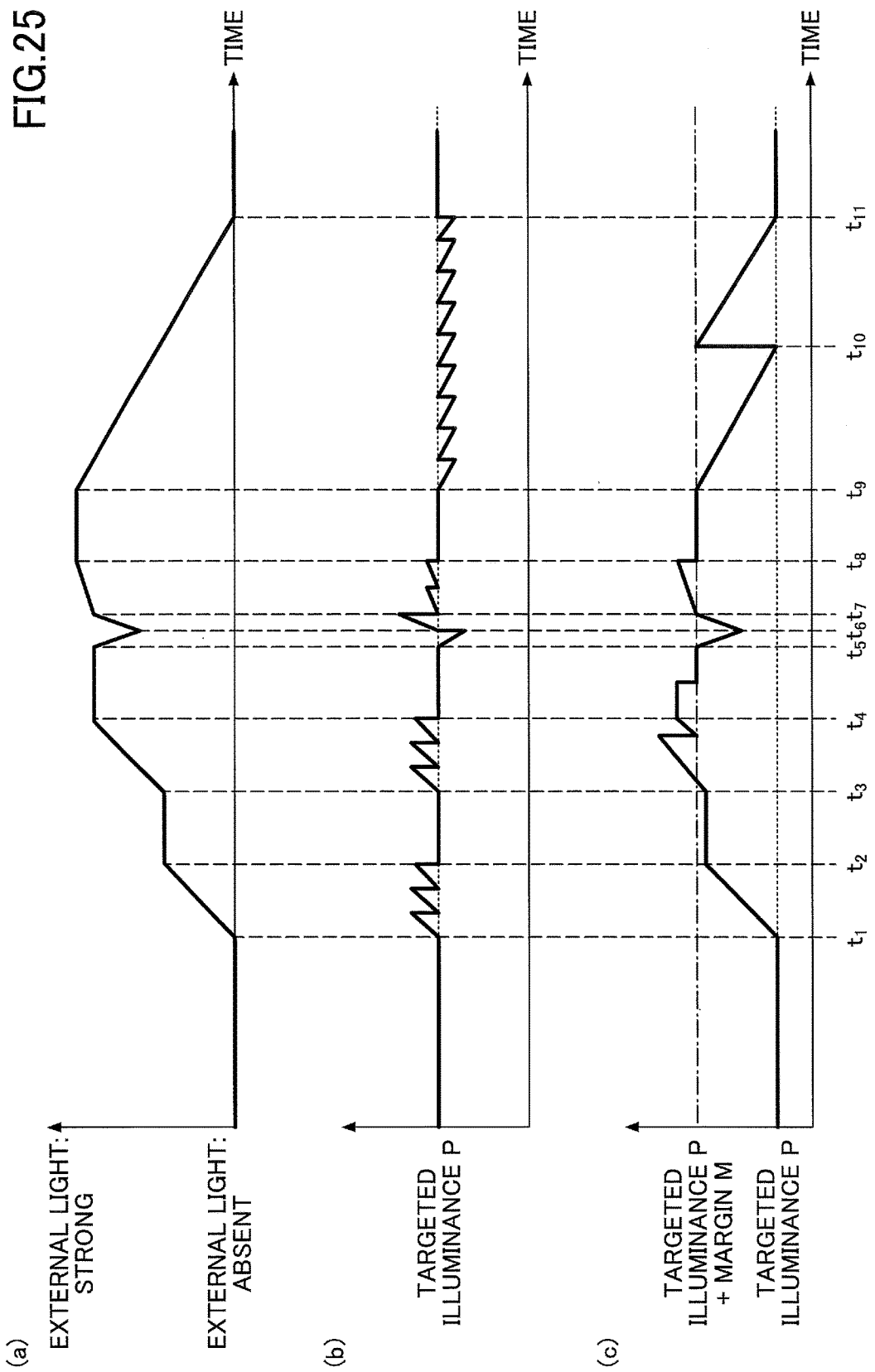
FIG. 25 is a graph illustrating an example of a situation of external light (a), an illuminance change according to a conventional control method (b), and an illuminance change according to a control method of the embodiment (c)

Advantages of the control method according to the embodiment with respect to a conventional control method will be descried with reference to FIG. 25. FIG. 25 is a graph illustrating an example of a situation of external light (a), an illuminance change according to a conventional control method (b), and an illuminance change according to a control method of the embodiment (c). The descriptions will be given based on a lapse of time.

From time t1 to time t2, the sun starts to rise and the external light starts to enter gradually. According to the control method of the embodiment, the light level of the first control target apparatus 1 is not controlled in the range of from "the targeted illuminance P to the targeted illuminance P+the margin M", the illuminance increases gradually from time t1 to time t2. On the other hand, according to the conventional control method, because the illuminance increases in accordance with the increase of the external light, control for decreasing the light level so that the illuminance becomes the targeted illuminance is performed many times.

From time t2 to time t3, for example, the sun is shaded by a cloud, and an intensity of the external light is constant. During time t2 to time t3, both the control method of the embodiment and the conventional control method do not control the light level.

From time t3 to time t4, the external light increases. In the conventional control method, the light level is controlled from time t3 to time t4 in a manner similar to that from time t1 to time t2. According to the control method of the embodiment, the light level is decreased when a length of time, during which the illuminance exceeds the targeted illuminance P+the margin M, exceeds the threshold t seconds. Thus, the light level of the first control target apparatus 1 is decreased so that the illuminance becomes the targeted illuminance P+the margin M.

From time t4 to time t5, although the external light is constant, the time, during which the illuminance exceeds the targeted illuminance P+the margin M, becomes longer than the threshold t seconds. Therefore, the light level of the first control target apparatus 1 is decreased so that the illuminance becomes the targeted illuminance P+the margin M.

From time t5 to time t6, the illuminance is rapidly changed (decreased) to a lower state due to the influence of the sun being hidden by a cloud temporarily. In the conventional control method, because the amount of the external light is decreased, it becomes darker than the targeted illuminance P. Thus, the light level is increased so that the illuminance becomes the targeted illuminance P in the conventional control method. On the other hand, according to the control method of the embodiment, the light level of the first control target apparatus 1 is not controlled in the range of from the targeted illuminance P to the targeted illuminance P+the margin M even if the external light changes rapidly. Thus, flickering is reduced according to the embodiment.

From time t6 to time t7, the sun hidden by the cloud appears and the illuminance is rapidly changed (increased) to a higher state from the lower state. In the conventional control method, although the light level is increased at time t6, the illuminance becomes higher than the targeted illuminance P soon because the external light increases. Thus, in the conventional control method, the light level is controlled to be decreased in this case. Accordingly, a flicker occurs. On the other hand, according to the control method of the embodiment, the light level of the first control target apparatus 1 is not controlled in the range of from "the targeted illuminance P to the targeted illuminance P+the margin M" even if the external light changes rapidly.

From time t7 to time t8, the external light increases. In the conventional control method, the light level is controlled from time t7 to time t8 in a manner similar to that from time t1 to time t2. According to the control method of the embodiment, the light level of the first control target apparatus 1 is not controlled when the threshold time t seconds has not passed.

From time t8 to time t9, because the external light is constant, the light level is not controlled.

From time t9 to time t10, the sun starts to sink gradually, and the external light gets dark (weak). In the conventional control method, because it becomes darker than the targeted illuminance P due to the decrease of the external light, the light level is increased so that the illuminance becomes the targeted illuminance P. In excessively response to the change of the external light, the light level is repeatedly increased and flickering occurs. On the other hand, according to the control method of the embodiment, upon the illuminance falling below the targeted illuminance P, the light level of the first control target apparatus 1 is controlled so that the illuminance becomes the targeted illuminance P+the margin M promptly. As can be expected from FIG. 25 comparing the control method of the embodiment with the conventional control method, the number of controlling times in the control method of the embodiment is fewer than the number of controlling times in the conventional control method. The management system 8 has a communication load for communicating when controlling the first control target apparatus 1. According to the control method of the embodiment, it is possible to reduce the communication load. Further, because the management system 8 controls all the first control target apparatuses 1, the reduction effect is great.

In the conventional control method, until illuminance obtained by the external light becomes zero, the light level is controlled from time t10 to time t11 in a manner similar to that from time t9 to time t10. According to the control method of the embodiment, the light level of the first control target apparatus 1 is not controlled when the illuminance does not fall below the targeted illuminance P. Therefore, it is possible to reduce flickering while securing the required illuminance according to the embodiment.

<Control Method to Targeted Illuminance P+Margin M>

The illuminance that the illuminance sensor detects is obtained as a signal representing the illuminance such as lux, and the first control target apparatus 1 is controlled by the light level. That is, the first control target apparatus 1 does not control the illuminance itself. Thus, according to the embodiment, a relationship between the illuminance and the light level is previously obtained (stored) as follows.

Figure 26:
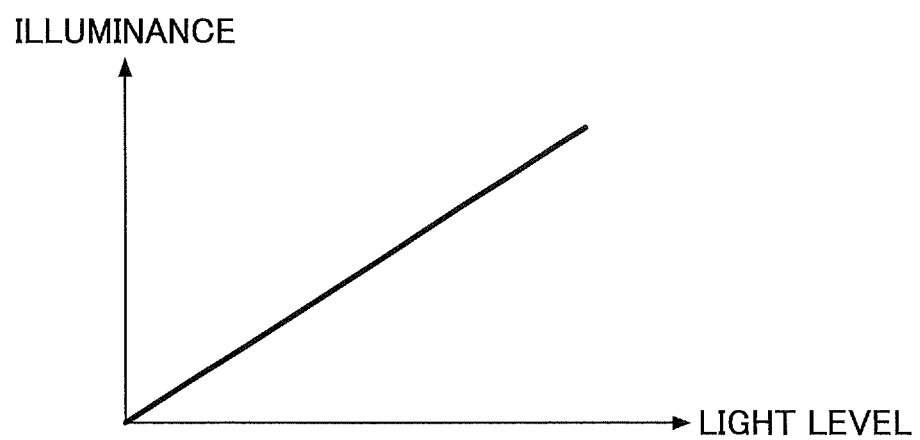
FIG. 26 is a graph illustrating an example of a relationship between a light level and illuminance according to the embodiment.

FIG. 26 is a graph illustrating an example of a relationship between the light level and the illuminance according to the embodiment. The graph of FIG. 26 illustrates the light level, gradually increased by the administrator or the like in a state in which external light is absent, and the illuminance corresponding to each light level. The illuminance is detected by an illuminance sensor. Because there is a proportional relationship between the light level and the illuminance, an illuminance corresponding to an arbitrary light level, and a light level corresponding to an arbitrary illuminance can be calculated by linearly approximating the relationship between the light level and the illuminance of FIG. 26. Accordingly, the generating unit 84 can determine the light level (amount of light) corresponding to the targeted illuminance P+the margin M based on the graph as illustrated in FIG. 26. If there is no proportional relationship, the relationship between the light level and the illuminance may be held in a table or the like.

According to such a control method, in comparison with a method of determining a light level to obtain the targeted illuminance P+the margin M in a feedback manner while detecting an illuminance, it is possible to control the illuminance to be the targeted illuminance P+the margin M promptly. Further, because the illuminance sensor detects, in response to white light or the like, an illuminance higher than the actual illuminance and detects, in response to black light or the like, an illuminance lower than the actual illuminance, the illuminance may become unstable when a person or the like moves in the detection area of the illuminance sensor. According to the embodiment, it is possible to reduce such inconveniences by converting the illuminance into the light level.

<Margin M>

For example, the margin M is set as a proportion to a targeted illuminance. For example, in a case where a targeted illuminance converted to a light level is 80%, a margin M is 16% when the proportion is 20%. That is, the targeted illuminance P+the margin M corresponds to the illuminance of the light level at 96%. In this way, by setting a margin as a proportion to a targeted illuminance, the margin M can be increased when the targeted illuminance P is high, and the margin M can be decreased when the targeted illuminance P is low. In other words, when controlling the first control target apparatus 1 so that the illuminance in the predetermined space becomes the targeted illuminance P or the targeted illuminance P+the margin M, the management system 8 may convert the targeted illuminance P or the targeted illuminance P+the margin M into a light level so that the illuminance in the predetermined space becomes the targeted illuminance P or the targeted illuminance P+the margin M. However, the margin M may be a constant value regardless of a value (intensity) of the targeted illuminance, for example. In this case, because the margin M is constant irrespective of the targeted illuminance P, an amount of change of brightness that a person feels when the first control target apparatus 1 is controlled is constant.

Further, it is preferable that the proportion and the constant value are determined in consideration of an amount of change of external light. When the sun is shed or hidden by a cloud, the external light changes so that the illuminance decreases and comfort is degraded. For example, an administrator or the like sets the proportion or the constant value so that the number of times of controlling the first control target apparatus 1 is equal to or less than N times from the daytime to sunset. Further, the administrator or the like sets the proportion or the constant value so that it does not exceed the margin M even when the sun appears or is hidden by a cloud. In this way, it becomes possible to control the first target apparatus 1 with reduced flickering.

Further, it is preferable that a change of illuminance due to ON/OFF of one or more adjacent first control target apparatuses 1 is considered for the proportion or the constant value. According to the embodiment, because the first control target apparatuses 1 are lighted/unlighted depending on the presence/absence of a person, illuminance sensors can detect the change of illuminance due to ON/OFF of the first control target apparatuses 1. If the illuminance falls below the targeted illuminance P every time an adjacent first control target apparatus 1 is turned OFF, the light level of the first control target apparatus 1 to be controlled is changed to be the targeted illuminance P+the margin M. Thus, the proportion or the constant value is decided so that the amount of change of illuminance due to turning OFF the adjacent first control target apparatus 1 becomes about one fourth of the margin M. In this case, unless the illuminance of the first control target apparatus 1 to be controlled when the adjacent control target apparatus 1 is turned OFF is less than "the targeted illuminance P+(¼) margin M", it becomes to prevent the light level of the first control target apparatus 1 to be controlled from being changed to be the targeted illuminance P+the margin M when the adjacent first control target apparatus 1 is turned OFF. Accordingly, it is possible to reduce the influence due to turning OFF the adjacent first control target apparatus 1. Similar effects can be obtained when the adjacent first control target apparatus 1 is turned ON. Note that one fourth is just an example. Half, one third, or one fifth may be used. In other words, the difference between the targeted illuminance P and the targeted illuminance P+the margin M may be determined based on at least one of a rapidity of change of external light, an amount of change of the external light within a fixed time, and a change of the illuminance due to turning off an adjacent first control target apparatus 1.

<<Operating Procedure>>

Figure 27:
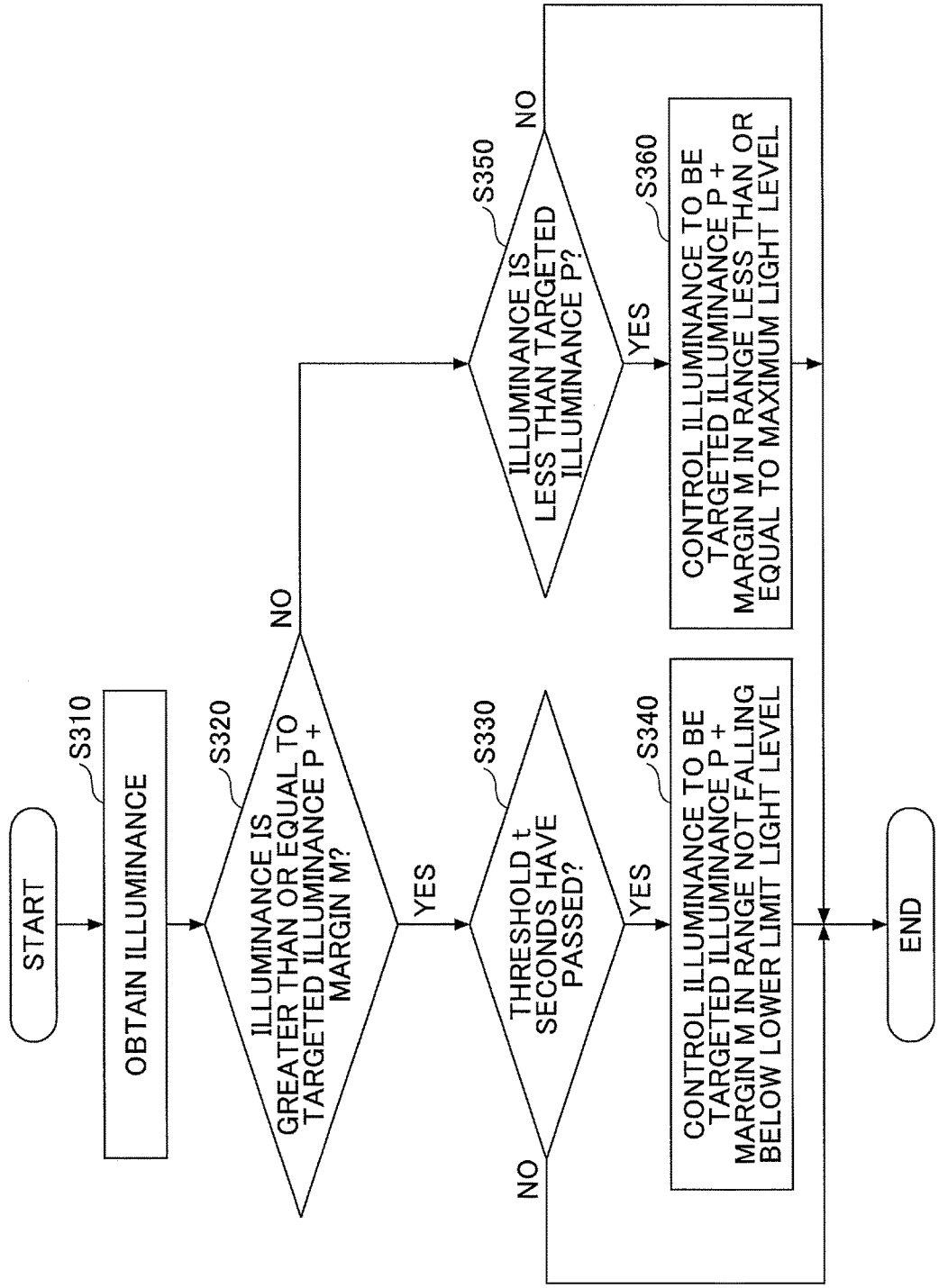
FIG. 27 is a flowchart illustrating an example of a procedure in which the generating unit controls the first control target apparatus according to the embodiment.

FIG. 27 is a flowchart illustrating an example of a procedure in which the generating unit controls the first control target apparatus 1 according to the embodiment. The procedure illustrated in FIG. 27 is performed when illuminance data is transmitted from the detecting apparatus 3. Note that this control is performed for one or more first control target apparatuses 1 for which it is determined by human detection that a light level is controlled to be automatic.

The generating unit 84 of the management system 8 obtains an illuminance in step S310. The generating unit 84 obtains, from the illuminance information management table, an apparatus ID of a detecting apparatus 3 associated with the first control target apparatus 1 to be controlled, and specifies the detecting apparatus 3 that detects illuminance data to be used for controlling the light level.

Next, in step S320, the generating unit 84 determines whether the illuminance is greater than or equal to the targeted illuminance P+the margin M. When determining that the illuminance is greater than or equal to the targeted illuminance P+the margin M (YES in step S320), the generating unit 84 determines in step S330 whether the threshold t seconds have passed. For example, the generating unit 84 turns on a timer at a point of time at which the illuminance becomes greater than or equal to the targeted illuminance P+the margin M.

When determining that the threshold t seconds have passed (YES in step S330), the generating unit 84 generates in step S340 control data for controlling the illuminance to be the targeted illuminance P+the margin M in a range not falling below the lower limit light level. When determining that the threshold t seconds have not passed (NO in step S330), the generating unit 84 does nothing.

When determining that the illuminance is less than the targeted illuminance P+the margin M (NO in step S320), the generating unit 84 determines whether the illuminance is less than the targeted illuminance P in step S350.

When determining that the illuminance is less than the targeted illuminance P (YES in step S350), the generating unit 84 generates in step S360 control data for controlling the illuminance to be the targeted illuminance+the margin M in a range less than or equal to the maximum light level.

When determining that the illuminance is not less than the targeted illuminance P (NO in step S350), the generating unit 84 does nothing.

According to the processing as described above, it becomes possible to control the illuminance as illustrated in FIG. 24 and FIG. 25.

(i) When the illuminance is in a range of from the targeted illuminance P to the targeted illuminance P+the margin M, the light level is not controlled.

(ii) When the illuminance exceeds the range of from the targeted illuminance P to the targeted illuminance P+the margin M, the light level is controlled so that the illuminance becomes the targeted illuminance P+the margin M only when the exceeding state exceeds the threshold t seconds.

(iii) When the illuminance falls below the targeted illuminance P, the light level is promptly controlled so that the illuminance becomes the targeted illuminance P+the margin M.

<Control of Illuminance in Case where Light Level is Set to be Automatic Part 2>

Figure 28:
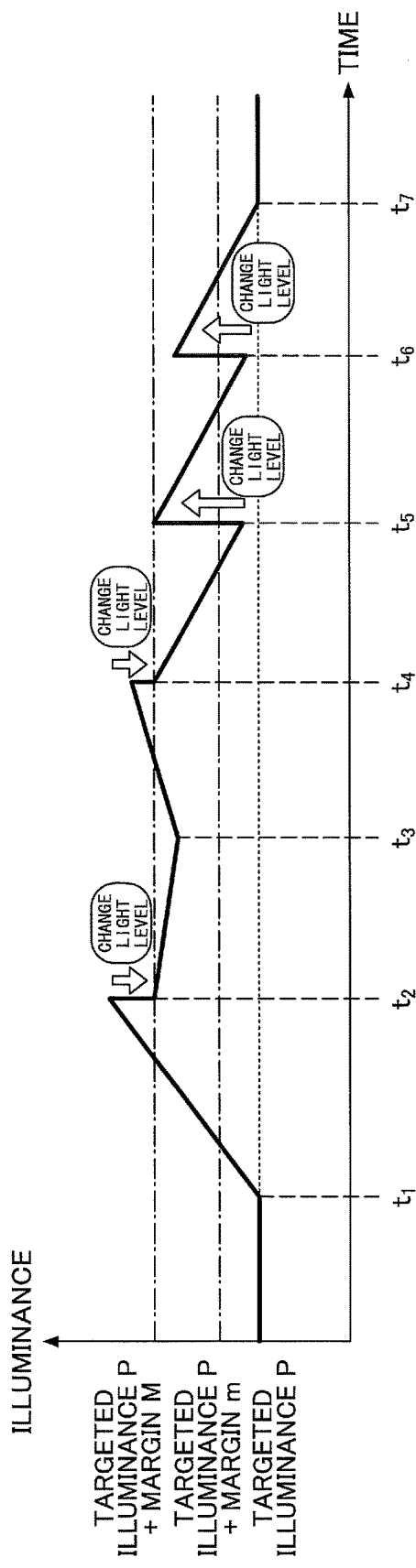
FIG. 28 is a graph illustrating another example of a manner in which the illuminance is controlled with respect to the targeted illuminance P, the targeted illuminance P+the margin M, and the targeted illuminance P+a margin m.

Another example of control of the illuminance in a case where the light level is set to be automatic will be described. FIG. 28 is a diagram illustrating another example of a manner in which an illuminance is controlled with respect to the targeted illuminance P+the margin M and the targeted illuminance P+a margin "m". Differences between FIG. 28 and FIG. 24 will be mainly described. In FIG. 28, the second margin "m" is provided (set). In the example of FIG. 28, when the light level of the first control target apparatus 1 is set to be the maximum light level in a state in which external light is not present, the illuminance in the predetermined space is the targeted illuminance P that is less than the targeted illuminance P+the margin m.

First, when the illuminance is in a range of from the targeted illuminance P+the margin "M" to the targeted illuminance P+the margin "m", the generating unit 84 does not control the illuminance. When the illuminance falls below the targeted illuminance P+the margin "m", the generating unit 84 controls the light level to be the targeted illuminance P+the margin M promptly. Therefore, in comparison with the control illustrated in FIG. 24, according to the control illustrated in FIG. 28, because the light level is controlled to be the targeted illuminance P+the margin M before falling below the targeted illuminance P, it is possible to further reduce a risk that the illuminance falls below the targeted illuminance P.

Note that after the light level reaches the maximum light level, although the illuminance may become less than the targeted illuminance P+the margin m, the illuminance does not become less than the targeted illuminance P because the maximum light level is set to be the targeted illuminance P.

Accordingly, the risk that the illuminance falls below the targeted illuminance P can be further reduced than the control of FIG. 24 by providing (setting) the second margin "m".

Note that the margin "m" does not have to be too large because the margin m is for controlling the illuminance not to fall below the targeted illuminance P. For example, if it takes several seconds from detecting the illuminance to control, an amount of change of external light, which may decrease in this several seconds, is the margin m.

Figure 29:
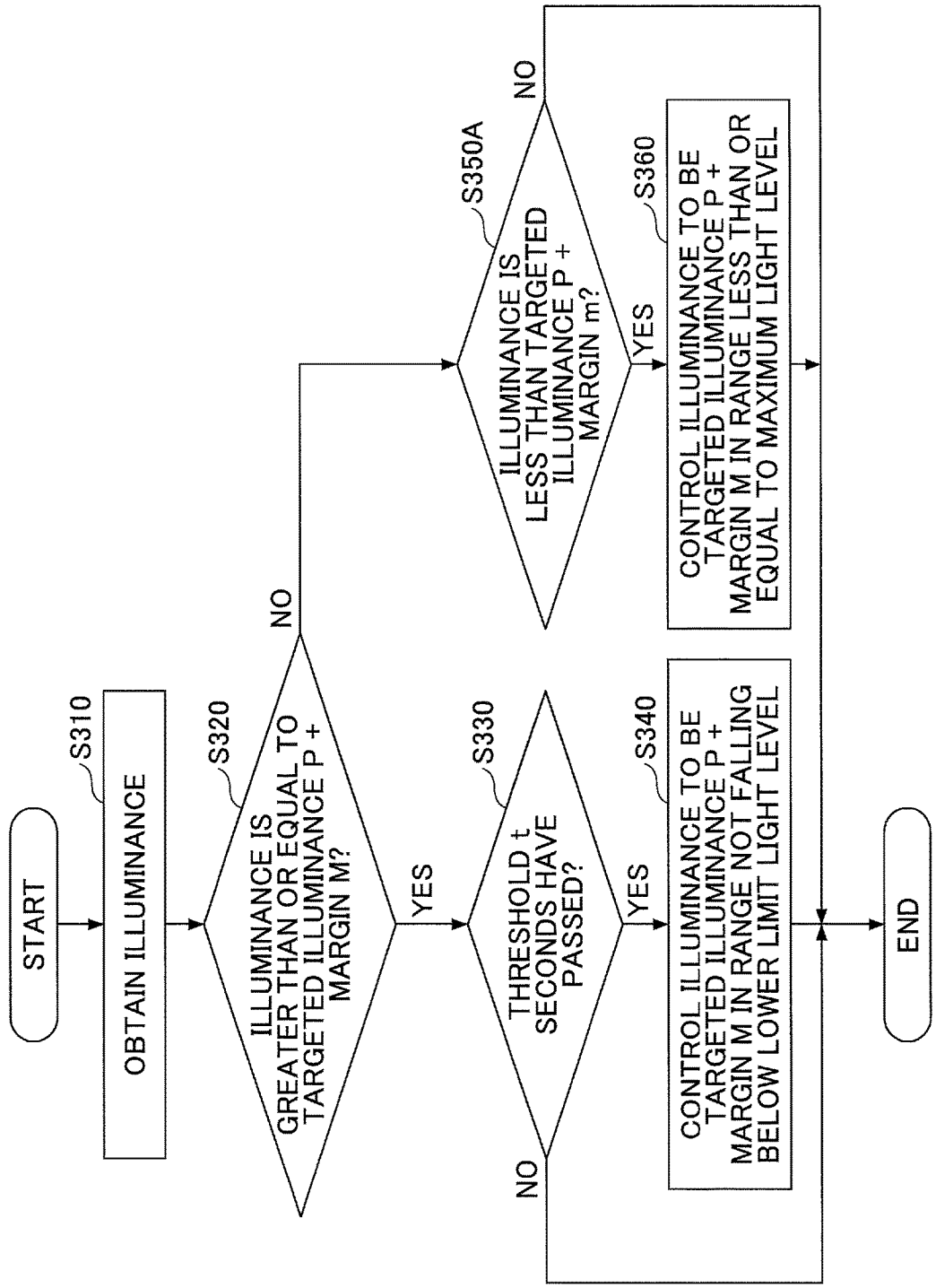
FIG. 29 is a flowchart illustrating another example of a procedure in which the generating unit controls the first control target apparatus according to the embodiment.

FIG. 29 is a flowchart illustrating another example of a procedure in which the generating unit 84 controls the first control target apparatus 1 according to the embodiment. Differences between FIG. 29 and FIG. 27 will be described.

Step S350A in FIG. 29 is different from step S350 in FIG. 27. In step S350A, the generating unit 84 determines whether the illuminance is less than the targeted illuminance P+the margin "m". The illuminance can be controlled, by the determination in step S350A, so as not to fall below the targeted illuminance P.

As described above, the device control system 100 according to the embodiment can detect a person and can control not only the air conditioning but also the illumination. Therefore, the device control system 100 according to the embodiment can enhance energy saving performance and comfort in comparison with a conventional system. Further, because the device control system 100 according to the embodiment can detect a person for each area 9 to appropriately control individual illumination, it is easy to reduce a situation, where illumination lights around a person have to be turned ON, and to enhance energy saving performance. Also, because the illumination is turned ON for at least detected person, comfort is less likely to be decreased.

Further, even if there is a time delay, from detecting the illuminance to controlling the light level, due to communication established between the detecting apparatus 3 and the management system 8, because the illuminance is controlled to be the targeted illuminance P+the margin M, it is possible to prevent the energy saving performance from being decreased and to enhance comfort.

Other Application Examples

Although the present disclosure has been described above with reference to the illustrative embodiment, the present disclosure is not limited to the embodiment as described above, and numerous variations and modifications may be made without departing from the scope of the present disclosure.

For example, although the detection data described in the embodiment includes heat source data, temperature/humidity data, and illuminance data, other information, such as $CO_2$ concentration, odor, viruses, bacteria, or the like may be detected and included in the detection data.

Also, in the above described embodiment, the first control target apparatus 1 is a fluorescent LED. However, the first control target apparatus 1 is not limited to a lighting apparatus that uses an LED but may be any type of illuminating apparatus. For example, an incandescent lamp, a fluorescent lamp, a halogen lamp, a high luminance discharger, or the like may be used as the first control target apparatus 1.

Also, in the above described embodiment, the second control target apparatus 2 is an air conditioner. However, the second control target apparatus 2 is not limited to an air conditioner with a so-called heat pump but may be any apparatus that influences the sensory temperature and/or humidity. For example, the second control target apparatus 2 may be a simple fan, a dehumidifier, a humidifier, an air cleaner, or some type of heater, but is not limited thereto.

Also, in the above described embodiment, the temperature distribution sensor is used to determine whether a person is present. However, in other embodiments, the presence/absence of an animal other than a human being may be determined. That is, any object, which radiates heat, including animals, robots, and the like may be detected. Also, in some embodiments, a camera such as an infrared camera may be used as the temperature distribution sensor. In this case, a moving object may be detected by image processing, and people and/or animals may be detected using infrared rays.

Also, the detecting apparatus 3 is not limited to being mounted on the first control target apparatus 1 corresponding to a fluorescent lamp but may also be installed at other locations, such as at a ventilation port of an air conditioner, at a fire alarm device, or the like.

Also, the functional configuration of the device control system 100 is not limited to the configuration as illustrated in FIG. 6. That is, FIG. 6 merely illustrates one example distribution of functions of the device control system 100 to facilitate understanding of processing implemented by the management system 8, the first control target apparatus 1, and the second control target apparatus 2. However, the present disclosure is not limited to the names and the way of distributing the processing units. Also, processing of the management system 8, the first control target apparatus 1, and the second control target apparatus 2 may be subdivided into more processing units depending on processing contents. Also, one processing unit may have further more kinds of processing.

Also, in some embodiments, the device control system 100 may include a plurality of management systems 8, and the functions of the management system 8 may be distributed to and installed in a plurality of servers.

Also, in some embodiments, one or more databases included in the storage unit 8000 of the management system 8 may be provided on the communication network N.

The management system 8 is an example of an information processing apparatus. The human detection range 601 is an example of a detection range. The transmitting/receiving unit 81 is an example of an obtaining unit. The generating unit 84 is an example of a device control unit. In an aspect, the targeted illuminance P is an example of a first targeted illuminance, and the targeted illuminance P+the margin M is an example of a second targeted illuminance. In another aspect, the targeted illuminance P+the margin "m" is an example of a first targeted illuminance, the targeted illuminance P+the margin M is an example of a second targeted illuminance, and the targeted illuminance P is an example of a third targeted illuminance.

It should be noted that the above described system according to the embodiment may be realized by a device memory, which stores at least one program, and at least one processor, which executes the at least one program to execute the processing as described in the embodiment. In other words, the management system 8 may be realized by the device memory and the at least one processor, for example. For example, the device memory and the at least one processor can implement functions as described in the embodiment and may be implemented by hardware elements as described in the embodiment.

The order of the method of the present disclosure is not limited to the order of processes of the method disclosed in the above described embodiment.

The present disclosure can be implemented in any convenient form, for example using dedicated hardware, or a mixture of dedicated hardware and software. The present disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Because the present disclosure can be implemented as software, each and every aspect of the present disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. For example, the CPU may be implemented by one or more processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Here, at least one program may be stored in a non-transitory recording medium that causes the management system 8 to execute processing as described in the embodiment.

Further, the present disclosure is not limited to these embodiments, but various variations and modifications may be made without departing from the scope of the present disclosure.

What is claimed is:

1. A device control system including a detecting apparatus configured to detect an object in a predetermined space, and an information processing apparatus configured to control an illuminating apparatus based on a detection result of the object, the device control system comprising:

an obtaining unit configured to obtain, from the detecting apparatus, information relating to an illuminance in the predetermined space; and a control unit configured to control, when the illuminance in the predetermined space falls below a first targeted illuminance, the illuminating apparatus so that the illuminance in the predetermined space becomes a second targeted illuminance that is greater than the first targeted illuminance, wherein when the illuminance in the predetermined space exceeds the second targeted illuminance for a time longer than a threshold time, the control unit controls the illuminating apparatus so that the illuminance in the predetermined space becomes the second targeted illuminance.

2. The device control system according to claim 1, wherein, when the illuminance in the predetermined space is in a range from the first targeted illuminance to the second targeted illuminance, the control unit does not control the illuminating apparatus.

3. The device control system according to claim 1, wherein, when the illuminance in the predetermined space falls below the first targeted illuminance, the control unit controls the illuminating apparatus in a range not exceeding a predetermined maximum light level so that the illuminance in the predetermined space becomes the second targeted illuminance.

4. The device control system according to claim 1, wherein, when the illuminance in the predetermined space exceeds the second targeted illuminance, the control unit controls the illuminating apparatus in a range not falling below a predetermined lower limit light level so that the illuminance in the predetermined space becomes the second targeted illuminance.

5. The device control system according to claim 1, wherein when a light level of the illuminating apparatus is set to be a maximum light level in a state in which external light is not present, the illuminance in the predetermined space is the first targeted illuminance.

6. The device control system according to claim 1, wherein when a light level of the illuminating apparatus is set to be a maximum light level in a state in which external light is not present, the illuminance in the predetermined space is less than the first targeted illuminance.

7. The device control system according to claim 6, wherein when a light level of the illuminating apparatus is set to be a maximum light level in a state in which external light is not present, the illuminance in the predetermined space is a third targeted illuminance that is less than the first targeted illuminance.

8. The device control system according to claim 1, wherein a difference between the first targeted illuminance and the second targeted illuminance is determined in consideration of a rapidity of change of external light, an amount of change of the external light within a fixed time, or a change of the illuminance in the predetermined space due to turning off an adjacent illuminating apparatus.

9. The device control system according to claim 1, wherein, when controlling the illuminating apparatus so that the illuminance in the predetermined space becomes the first targeted illuminance or the second targeted illuminance, the control unit converts the first targeted illuminance or the second targeted illuminance into a light level so that the illuminance in the predetermined space becomes the first targeted illuminance or the second targeted illuminance.

* * * * *